(12) United States Patent
Davis et al.

(10) Patent No.: US 8,631,048 B1
(45) Date of Patent: Jan. 14, 2014

(54) DATA ALIGNMENT SYSTEM

(75) Inventors: Jennifer A. Davis, Cedar Rapids, IA (US); Joseph J. Engler, Coggon, IA (US); John A. Yanosy, Jr., Grapevine, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 149 days.

(21) Appl. No.: 13/200,117

(22) Filed: Sep. 19, 2011

(51) Int. Cl.
*G06F 17/30* (2006.01)

(52) U.S. Cl.
USPC .......................................................... 707/803

(58) Field of Classification Search
USPC .......................................................... 707/803
See application file for complete search history.

(56) References Cited

U.S. PATENT DOCUMENTS

| | | | |
|---|---|---|---|
| 2007/0288250 A1* | 12/2007 | Lemcke et al. | 705/1 |
| 2008/0215542 A1* | 9/2008 | Lim et al. | 707/3 |
| 2008/0256069 A1* | 10/2008 | Eder | 707/5 |
| 2008/0294679 A1* | 11/2008 | Gatterbauer et al. | 707/102 |
| 2009/0271342 A1* | 10/2009 | Eder | 706/20 |
| 2010/0281061 A1* | 11/2010 | Chen | 707/794 |
| 2011/0010099 A1* | 1/2011 | Adourian et al. | 702/19 |
| 2011/0033095 A1* | 2/2011 | Hale et al. | 382/131 |

OTHER PUBLICATIONS

Cerbah, F., Mining the Content of Relational Databases to Learn Ontologies with Deeper Taxonomies, IEEE/WIC/ACM International Conference on Web Intelligence and Intelligent Agent Technology, wi-iat, vol. 1, pp. 553-557, 2008.

Ghawi, R., et al., Database-to-Ontology Mapping generation for Semantic Interoperability. Slides available online via http://www.slideshare.net/rajighawi/db2owl, 21 pages, and Published Paper, VLDB 2007, 8 pages, Sep. 23-28, 2007.

Yuan, A., et al., Discovering the Semantics of Relational Tables through Mappings, On Data Semantics VII, LNCS4244, 32 pages, 2006; available online via http://www.cs.utoronto.ca/~yuana/research/publications/JoDS_VII.discovering.pdf.

* cited by examiner

*Primary Examiner* — Wilson Lee
*Assistant Examiner* — Tiffany Thuy Bui
(74) *Attorney, Agent, or Firm* — Donna P. Suchy; Daniel M. Barbieri

(57) ABSTRACT

Methods, systems, and computer-readable media relating to adapting existing data based on one or more new sets of data are provided. An exemplary method comprises extracting a data model from a new data set. The method further comprises determining one or more ontology assertions based on the extracted data model and modifying at least one existing ontology based on the one or more ontology assertions.

19 Claims, 11 Drawing Sheets

DATA ALIGNMENT SYSTEM

COMPUTER PROGRAM LISTING APPENDIX

A computer program listing appendix has been submitted on compact discs with the present application, and the material included on the compact disc is incorporated herein by reference in its entirety. Two identical compact discs have been submitted, each including a single file entitled "Computer Program Listing Appendix: Exemplary Intermediate Schema Ontology Source" that was created on Sep. 15, 2011 and is 1,117 kb in size. The file includes Web Ontology Language ("OWL") code that may be used to implement various data alignment features according to various exemplary embodiments.

BACKGROUND

The present disclosure relates generally to the field of data alignment. More specifically, the present disclosure relates to systems and methods for aligning data models or schemas (e.g., different databases) so that the information stored in the data models (schemas) may be quickly used in conjunction with other available data once it becomes available. In some embodiments, this use of the data contained in multiple databases may be further facilitated by the creation of an ontology representing the knowledge inherent in the results of the semantic merger of the relational structure and elements of each of the data base models.

The data model (schema) of a relational database, alternatively known as a database schema, may be a metadata language that defines the database structure incorporating the definitions of tables for organizing rows of data, where the columns of each table (also known as table fields) define the constituent data elements for each row of data in the table. Each table often has a primary key comprising a logical subset of table fields that are used to index into and sequence the data rows of a table. Relations between tables are defined using Foreign Keys in the referencing table that are equivalent to Primary Keys in the referenced table. The database schema may define both the internal structure of the database tables holding rows of data, and the relations between them.

Methods to align multiple database schemas into an overall schema may merge schema elements that are common (e.g., determining equivalent semantic relationships between the different schemas, their elements and structure and representing the aligned results in a machine interpretable form that represents this aligned knowledge). If there are no common elements than there is no alignment, only aggregation.

The names used for the database schema elements may have an implied semantic meaning related to a domain of knowledge and contextual purpose. For example, a database and associated schema may contain data about health care practitioners, their specialties, qualifications, and office hours, and, as appropriate, equivalent field names within the schema table definitions. The names or vocabulary for the names of the tables, fields, and relational foreign keys likely may be relevant, to persons familiar with the field, to terms understood in the domain of knowledge for healthcare providers. Database schemas may have no explicit semantics defined that are machine interpretable; rather, other contextual information (specification documents, help files, etc.) may be used to develop an understanding of the meaning of the schema elements (e.g., table names, field names, relational names, etc.).

There are many operational domains where an alignment across databases would provide information about relationships between data that were not present in a single database. Data alignment methods described herein may help to uncover these relationships. Often analysts have a large number of sizable data sets they need to search to discover information about relationships across data sets. In order to discover these relationships across data sets, they need to be aligned. For example, a location stored as lat/long in one data set may need to be aligned with a location stored as a street address in another data set. Quickly aligning new data sets is further complicated by the fact that, in various applications, new data sets are often added on a regular basis, and there is not a way to automatically align them with the existing data. Rather, new data sets must often be manually aligned with existing data (e.g., by a human analyst manually inspecting the new data sets and determining how the new data should be aligned with the existing data). Such manual alignment is a time-consuming process that requires substantial resources (e.g., human resources) and delays the availability of potential valuable new information for use in conjunction with previously available data.

SUMMARY

One exemplary embodiment of the present disclosure relates to a method of adapting existing data based on one or more new sets of data. The method comprises extracting, using an extraction module, a data model from a new data set. The method further comprises determining, using the extraction module, one or more ontology assertions based on the extracted data model. The method further comprises modifying, using an alignment module, at least one existing ontology based on the one or more ontology assertions. The extraction module and alignment module comprise instructions stored on at least one computer-readable medium that are executable by a processor.

Another exemplary embodiment relates to a data alignment system comprising an electronic processor configured to extract a schema from a new data set. The electronic processor is further configured to determine one or more ontology assertions based on the extracted schema and modify at least one existing ontology based on the one or more ontology assertions.

Another exemplary embodiment relates to one or more computer-readable media having instructions stored thereon. The instructions are executable by one or more processors to implement a method comprising extracting a data model from a new data set. The method further comprises determining one or more ontology assertions based on the extracted data model and modifying at least one existing ontology based on the one or more ontology assertions.

DETAILED DESCRIPTION

Figure 1A:
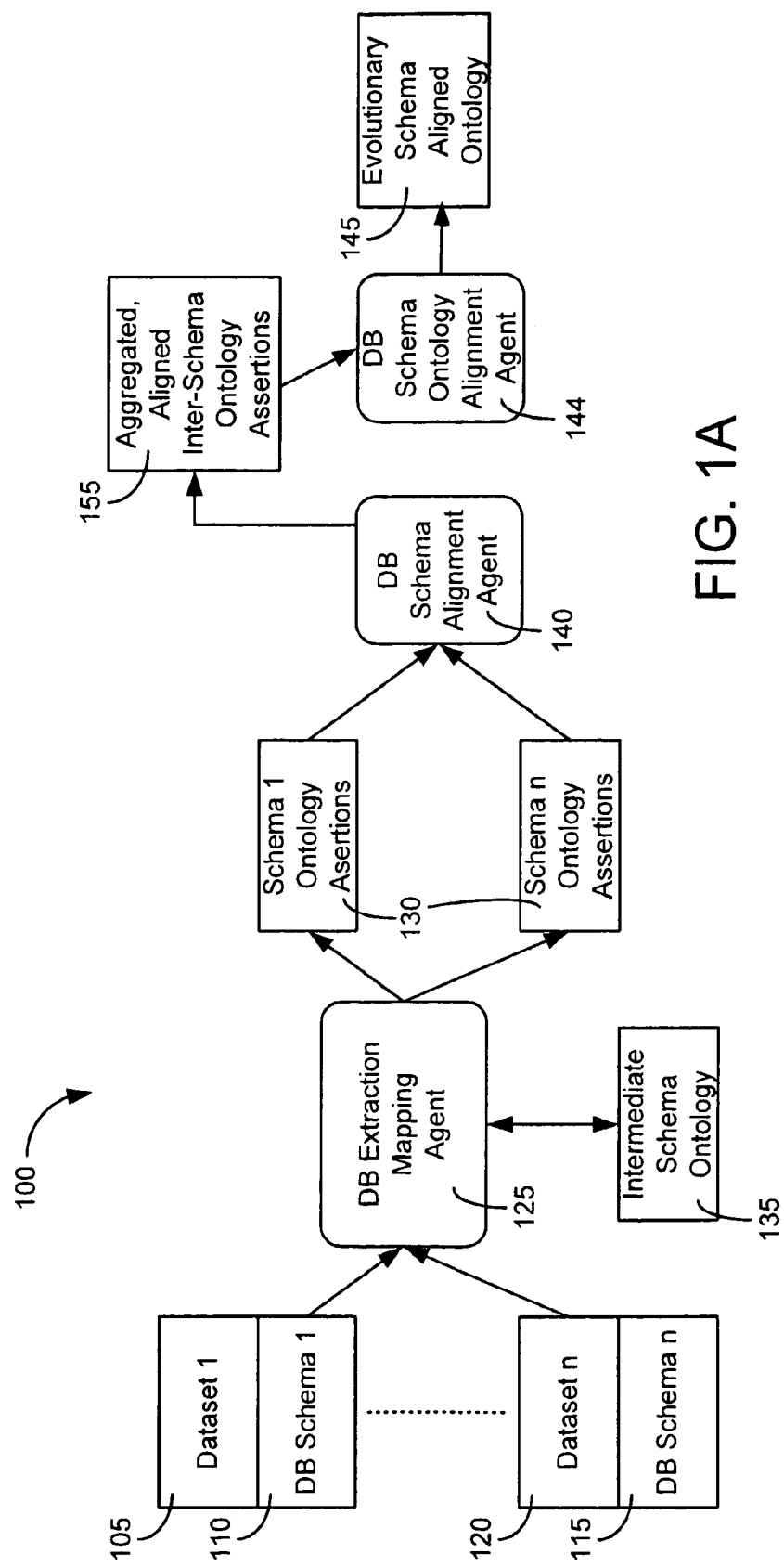
FIG. 1A is a data flow diagram illustrating a data extraction and transformation process that may be performed by an alignment system according to an exemplary embodiment.

Referring generally to the figures, systems and methods for aligning new data sets and/or models with existing data are disclosed according to various exemplary embodiments. Exemplary embodiments disclosed herein provide a way to create a single ontology from the analysis and alignment of multiple database schemas that have some elements in common. Exemplary embodiments disclosed herein utilize an artificial cognition system capable of aligning data models (schemas) in an automated fashion so that analysts can quickly use the new aggregated and aligned data sets as they become available. In some embodiments, exemplary systems and methods disclosed herein may allow for new data to be incorporated with existing data with up to a tenfold or greater reduction in time as compared to manual alignment.

Various exemplary embodiments of the present disclosure utilize an ontology solution to the data alignment problem that leverages a multi-agent cognition system. An ontology is a formal representation of knowledge for a domain of interest using an ontology standard language, such as the World Wide Web Consortium ("W3C") RDF/OWL standard, which enables creation of a set of ontology statements to define a meta-model consisting of a set of domain concepts, their data properties, and a set of relationships among the concepts. In essence, an ontology is a metamodel of the concepts of interest in a domain and their properties and relationships. With this ontology meta-model, a knowledge base can than be created consisting of a set of facts about the domain using the ontology definitional statements. The formal language used to represent the ontology also enables logical inferences to be made against the ontology and facts of the domain knowledge base. In various exemplary embodiments described herein, an Intermediate Schema ontology is defined to enable assertions to be made in a knowledge base describing each database schema that is desired to be aligned. These separate schema knowledge bases are then analyzed for creation of an aggregated and aligned schema ontology, using the same language and meta-model defined for the Intermediate Ontology. An initial ontology with some concepts and relations may be provided to act as the target for the final aggregated and aligned schema ontology.

According to some embodiments, data alignment agents learn the data model or schema for each data set by first extracting the schema model and creating sets of assertions in the Intermediate Ontology knowledge base to represent knowledge about the data model schema. Then, agents (e.g., a different set of agents) align the set of intermediate ontology schemas, and, subsequently, another set of agents match and align this aggregated and aligned intermediate ontology assertions to the final aligned schema ontology. In some embodiments, this matching may include degrees of uncertainty with respect to the matching of concepts across intermediate ontology schemas and between the intermediate ontology schema and the final aggregated and aligned schema ontology.

The alignment system may evolve both the aggregated intermediate ontology assertions and the final aligned schema ontology assertions in a similar manner, e.g., by adding new concepts, concept properties, and/or inter-concept relationships from the source schema to the target aligned schema ontology and making additional equivalence assertions for those concepts, data properties, and relations that match. Both of these approaches may utilize the Intermediate Schema Ontology as the language to assert these alignment facts in their respective knowledge bases. As this alignment occurs, the respective target schema ontology evolves with new alignment assertions to become the new schema ontology knowledge base to which the agents will match the next data set and its respective schema. In some embodiments, new alignment agents with different capabilities may be added to improve the alignment results, such that the overall system may become more accurate and comprehensive in its database schema alignments represented in the ontology assertions in the respective alignment ontology knowledge base (e.g., the aggregated and aligned intermediate schemas and/or the final aggregated and aligned schema).

The data alignment systems and methods disclosed herein may be used in a variety of applications. For example, mobile communication device (e.g., cellular telephone) communication data may be aligned with data relating to the geographic location of cellular towers, or student data with university curriculum, facility resources, and faculty data. The latter example will be used as an exemplary application to describe the alignment system concepts. The solutions disclosed herein may be applied in any environment (e.g., a business operations environment) in which there are multiple data sets (e.g., multiple models, data definitions, schemas, vocabularies, and/or ontologies) where it is desired to have a comprehensive aligned schema ontology to enable reasoning and inferences across data sets. Various other exemplary applications include, but are not limited to, sensor fusion and database alignments (e.g., alignment of data relating to various systems of an aircraft, such as navigation and/or terrain awareness systems), enterprise database alignments, interagency information sharing (e.g., defense, law enforcement, business administration, and/or other types of agencies), fusing cyber-security alerts and information for different systems (e.g., data relevant to attacks on computing systems, such as network-based attacks), generating a network-centric common operating picture, etc.

Before turning to the figures, various terms are used throughout the present disclosure to describe different concepts and/or data structures. For example, a data set is an organized structure representing and/or containing data. In some embodiments, a data set may include tables with records or rows of data within each table and/or relationships between them defined by the keys of a data model or schema.

A data model or schema describes the structure and vocabulary used for a database or data set (e.g., through a meta-model). All rows of data within a table may have the same set of associated data properties organized in columns or fields with names and constraints on the type of data for that field. Data rows or records in a table may be indexed with primary keys which are subsets of fields of the table. Relationships between rows of data between tables may be defined by foreign keys in a referencing table which are equivalent to a primary key in the referenced table. A data set often has no explicitly defined machine interpretable semantics related to a domain of discourse.

An ontology is a metamodel (e.g., machine interpretable) of human knowledge that may include concepts, concept properties, and/or relationships between concepts with an associated formal logic defining the rules of inference. The interpretation of data in a knowledge base that is consistent with an ontology defines a semantic interpretation of elements of the expression as they relate to objects and properties in a domain of interest.

A domain ontology is an ontology where the concepts are defined and interpreted typically as having an associated set of entities or objects in a domain of discourse. The vocabulary used for naming the concepts and relations are typically those of the particular domain. A domain data definition is a structured data definition for one data element and may include a name and/or some defined properties for the data element. An XML domain schema is an example of a set of data definitions with no overall model or semantics. The names used for the data element and its properties may be associated with a domain of discourse.

Referring now to FIG. 1A, a data flow diagram 100 illustrating a data extraction and transformation process that may be performed by an alignment system is shown according to an exemplary embodiment. The alignment system may implement the data extraction and transformation process and/or various other processes described in the present disclosure using instructions stored in one or more computer-readable media that are executable by a processor of the alignment system. In various embodiments, the alignment system may utilize the data extraction and transformation process to align data received from a variety of data sets (e.g., different databases). Various exemplary applications in which the systems and processes disclosed herein may be utilized may include security and threat detection, avionics, finance, human resource management, product classification, and/or any other type of application where data may be retrieved from a variety of different sources. For example, in one embodiment, data extraction and transformation processes such as those disclosed herein may be used to align several data sets relating to national security. The alignment system may be used to extract national security data from databases developed by various intelligence sources such as the U.S. Federal Bureau of Investigation, Central Intelligence Agency, Homeland Security, various branches of the military, Federal Aviation Administration, etc. and align the data. By aligning the data, an evolving master data set may be developed that may include all of the knowledge stored in the individual data sets. Additionally, as new information is added to the data set, the various assertions embodied in the data sets may be used to infer new knowledge based on the combination of knowledge stored in the individual data sets. In the area of national security, this may allow intelligence analysts to respond more rapidly and effectively to potential national security risks.

The alignment system may be configured to receive one or more new datasets 105 and 120 and their associated schemas 110 and 115 to be ultimately aligned with an existing schema aligned ontology and knowledge base 145. Each of the new data sets has a database schema associated therewith (e.g., schemas 110 and 115) defining the internal structure of the database, in the form of tables, column names or fields, primary keys and foreign keys relating the tables to each other. A subset of the table's fields are used as primary keys for indexing the dataset records in each table, while another subset may used as foreign keys to define a relationship between the records of this table and records of another table. In some embodiments, the subset of fields used as primary keys may overlap the subset of fields used as foreign keys. The rows of actual data conforming to the table and field structure are called records.

The alignment system may include a Database ("DB") Extraction Mapping Agent 125 configured to extract the information stored in each individual data set and represent the information as a set of assertions. DB Extraction Mapping Agent 125 implements a process configured to extract the schema for each data set and represent their schema definitions using an intermediate ontology (ref. no. 135). The extraction results will be stored as a set of intermediate ontology assertions 130 for each dataset schema in a knowledge base.

Once the intermediate set of assertions 130 for each dataset schema are created using intermediate ontology language 135, they are then aggregated and aligned across each other by a DB Schema Alignment Agent 140 to create the Aggregated Aligned Inter-Schema Ontology Assertions 155. Subsequent to this schema aggregation and cross alignment, they are then aligned to an existing or current ontology 145 by a DB Schema Ontology Alignment Agent 144.

Figure 1B:
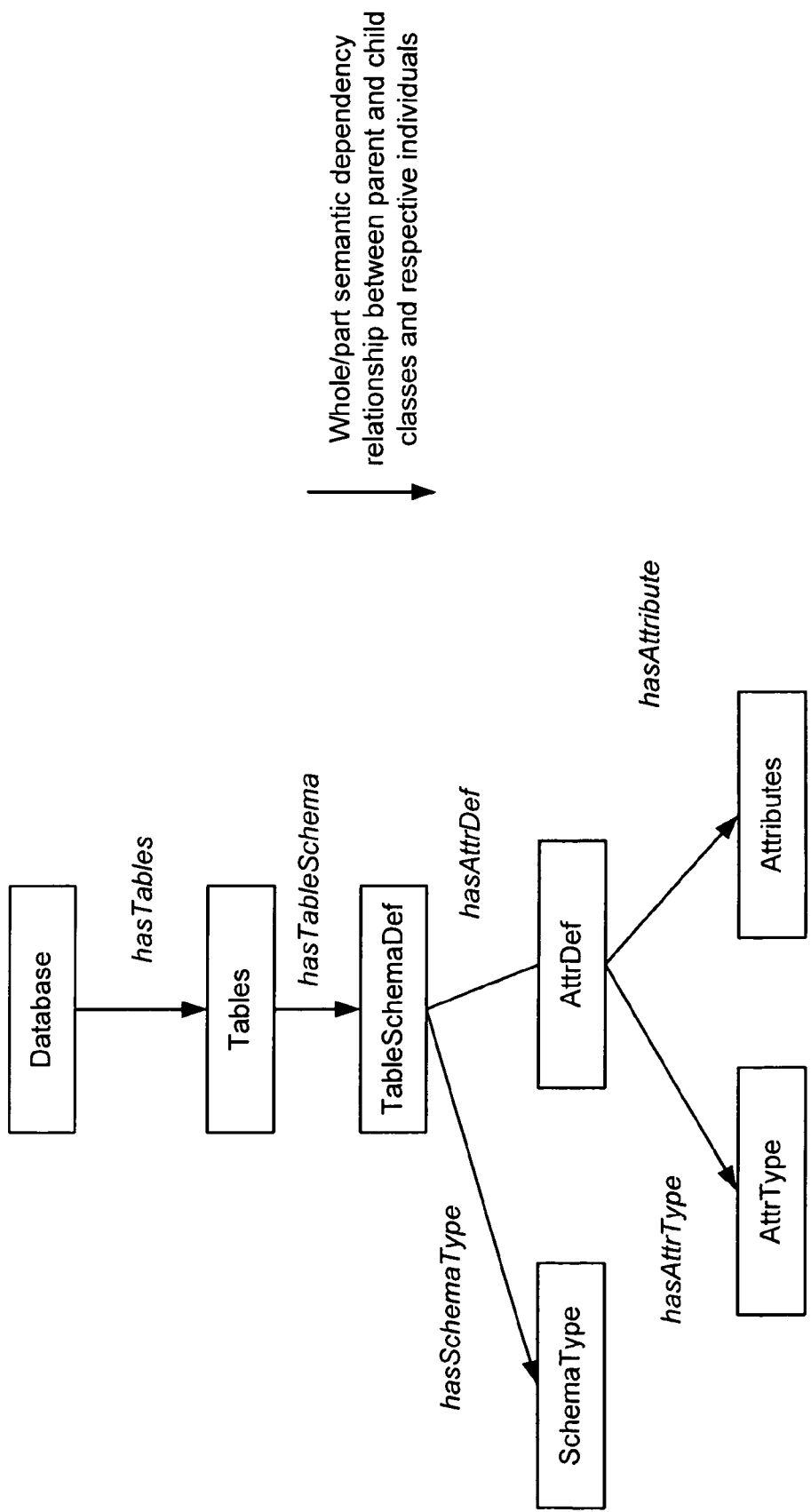
FIG. 1B is a schematic illustration of a hierarchy of class definitions according to an exemplary embodiment.
Figure 1C:
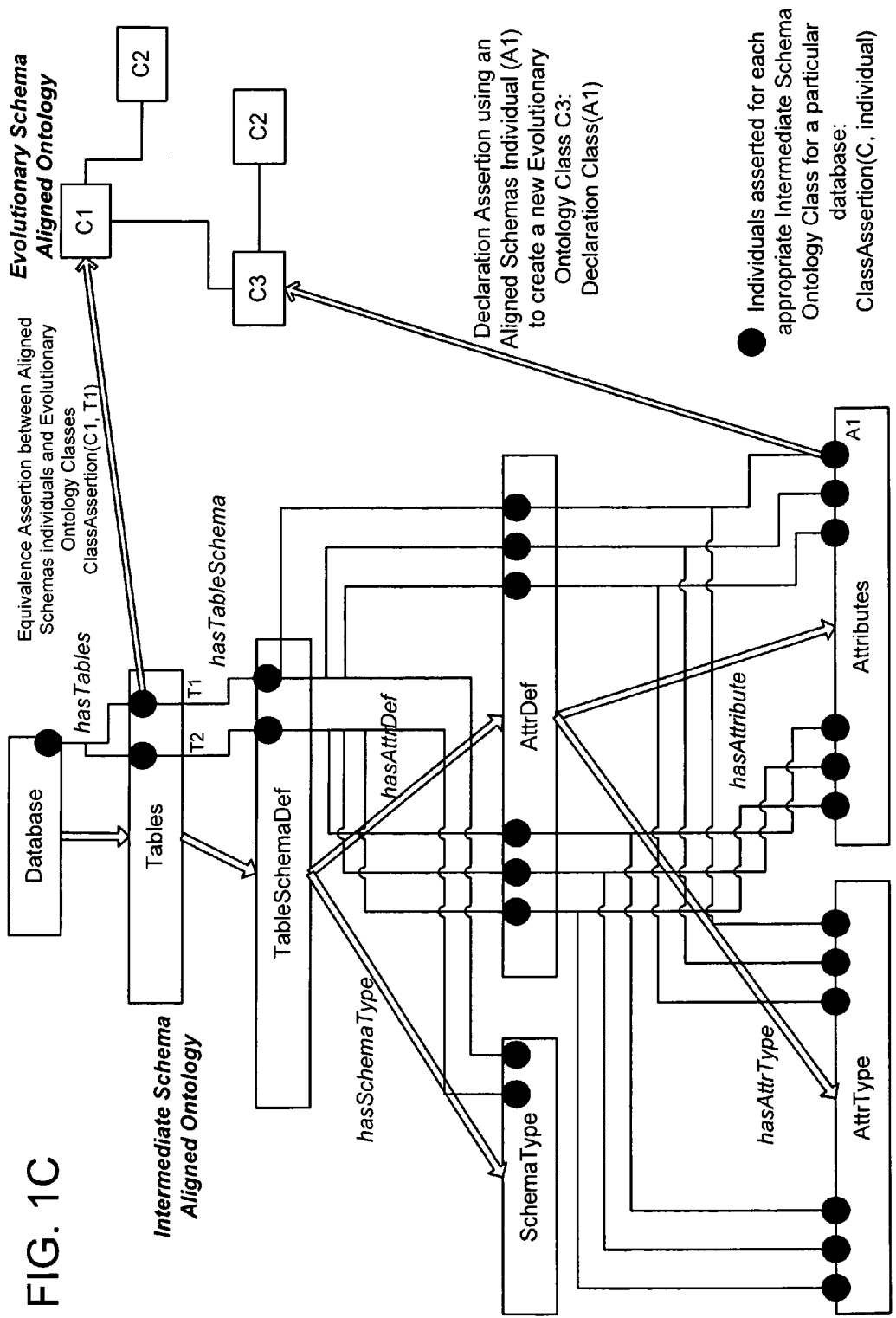
FIG. 1C is a schematic illustration of the alignment of sample assertions according to an exemplary embodiment.

According to some exemplary embodiments, this evolution of the schema aligned ontology 145 may occur by adding schema assertion statements obtained from the aggregated and inter-schema aligned ontology 155 using the following alignment concepts:

1. All schema assertion and ontology statements are in the form of OWL/RDF statements in the following syntactic form, <S, P, O>, Subject, Property, Object. There are two types of ontology definition statements:
   a. Ontology defining statements where S and O are classes, and P is an object property between classes, or a data property between a class and a data type
      i. Class defining statement between classes <Cs, Po, Co> where Cs and Co are classes of the ontology and Po is the object property defining a relationship between these classes
      ii. Class data type statement defining a data property between a class and a data type <Cs, Pd, Do> where Cs is the subject class, and Pd is a data property of class Cs for data type Do
   b. Ontology assertions defining relations between individuals of classes using object properties, or relations between a class and a data value using a data property
      i. Class individual object property relationship statements <Is, Po, Io> where Is and Io are the asserted individuals of the subject and object classes respectively in a relationship defined by Po
      ii. Class individual data property relationship statements <Is, Pd, Id> where Is is an individual of the subject class and Pd is the data property relating the individual Is to a datatype value Id
2. Alignment may occur in one or both of the following places:
   a. inter-schema (i.e., between schema intermediate ontology assertions 130 performed by DB Schema Alignment Agent 140)
      i. The intermediate schema ontology used to represent each database may be formed as a hierarchy of class definitions (see, e.g., FIG. 1B), where each higher schema definition class is dependent on lower level class definitions.
      ii. When the same intermediate schema ontology is used to represent the structure and elements of each database to be aligned, there are no class level equivalence statements to be asserted between them; they are already equivalent. Instead, the allowed alignment equivalence assertions are for individual schema assertions describing each database and its constituent elements. Alignment occurs between individual schema assertions between two schemas for their respective databases.

iii. For a particular database description, a set of individual instances may be asserted for the respective classes in the intermediate schema ontology. The intermediate schema definitional class hierarchy that follows a whole/part taxonomy, where a higher schema definition class is dependent on the set of lower schema class definitions, may create a similar whole/part taxonomy for the respective individuals in the respective class assertions. The intermediate schema ontology taxonomic dependency structure is described, according to one exemplary embodiment, as follows:
  1. Class: Database "Named database defined by a set of named Tables. Dependent Class=<Tables>."
  2. Class: Tables "Set of named tables comprising Database, defined by a single TableSchemaDef. Dependent Class=<TableSchemaDef>."
  3. Class: TableSchemaDef "Named schema defining named Table structure and consisting of a defining SchemaType for the table, and one AttrDef for each column(Attribute) of the table. Dependent Class=<SchemaType>, <AttrDef>"
  4. Class: SchemaType "one of 3 schema types defining possible key combinations for the Table. This is a terminal class with no dependent classes."
  5. Class: AttrDef "defines the named set of properties for a TableSchemaDef consisting of column; e.g., defined by Attributes, and whether it has a key by AttrType. Dependent Class=<AttrType>, <Attributes>."
  6. Class: AttrType "defines whether the AttrDef is a key. Class has predefined individuals with one selected through property hasAttrType for Named individual in AttrDef. There are no dependent classes."
  7. Class: Attributes "defines individual column name for Table defined by TableSchemaDef and by AttrDef."

iv. The alignment dependencies may be defined using the above intermediate schema ontology whole/part taxonomy and are illustrated in FIG. 1B. The following axiomatic guidelines provide the basis for creating alignment assertions, according to an exemplary embodiment:
  1. For two databases (Db1, Db2) to be equivalent, all individual assertions for Tables T1 and Tables T2 in respective databases for relationship hasTables may be required to be paired in equivalent relationships: SameIndividual(T1s, T2s)→SameIndividual(Db1,Db2)
  2. For two Tables (T1, T2) to be equivalent, each individual asserted for TableSchemaDef1 and TableSchemaDef2 respectively in relationship hasTableSchemaDef may be required to be equivalent: SameIndividual(TSc1,TSc2) →SameIndividual(T1,T2)
  3. For two TableSchema Defs (TSc1, TSc2) to be equivalent, each individual asserted for AttrDef1 and AttrDef2 respectively in relationship hasAttrDef may be required to be equivalent and each individual asserted for SchemaType1 and SchemaType2 respectively may be required to be equivalent: SameIndividual(ScType1,SCType2) AND SameIndividual(AttrDef1,AttrDef2) →SameIndividual(TSc1,TSc2)
  4. For two AttrDefs (AttrDef1, AttrDef2) to be equivalent each individual asserted for Attr1 and Attr2 respectively in relationship hasAttribute may be required to be equivalent and each individual asserted for AttrType1 and AttrType2 respectively may be required to be equivalent: SameIndividual(AttrType1,AttrType2) AND SameIndividual(Attr1,Attr2)→SameIndividual (AttrDef1,AttrDef2)

b. between aggregated and aligned inter-schema assertions 155 and evolutionary schema aligned ontology 145 by DB Schema Ontology Alignment Agent 144 (See FIG. 1C for an illustration of exemplary alignment cases between inter-schema individual assertions and an evolutionary schema aligned ontology)
  i. Each individual asserted in the aligned inter-schema assertions (155) is analyzed for equivalence with classes in the evolutionary aligned schema ontology 145, and if there is an equivalence an assertion is made to relate the individual with the class: ClassAssertion(EvolOntClass, InterSchemaIndividual). If there is no equivalence with a class, then the name of the individual is used as a definition for a new class in the evolutionary aligned schema ontology: Declaration(InterSchemaIndividual).
  ii. The evolutionary aligned schema ontology 145 may have other classes used from related ontologies (see, e.g., FIG. 5, ref. no. 510) that have been aligned with aligned inter-schema individual assertions 155.

3. The actual alignment assertions relating elements of the individual schema assertions are statements using the following guidelines:
  a. Statements with one or more semantic matches of elements <S, P, O>
    i. Identifying semantic matches of the elements of the two statements being compared, e.g., the <S, P, O> of each statement,
    ii. then creating additional equivalence statements asserting equivalence where semantic equivalence of the respective elements <S,P,O> elements exists,
    iii. adding the original compared assertions and the relevant equivalence assertions to the evolutionary schema aligned ontology 145
  b. Statements with no semantic matches
    i. If no semantic matches occur between a statements elements and all other statements of the aligned ontology, than it is added to the aligned ontology without any additional equivalence statements
  c. Semantic matches may include hypernym (e.g., a term whose meaning includes the meanings of other words; for example, animal is a hypernym of dog) and hyponym (e.g., a term that designates a member of a class; for example, dog is a hyponym of animal) relationships between classes, relating to a more general semantic concept or to a more specific semantic concept respectively. In some embodiments, a reference dictionary may be used to discover these relations between the names of the compared classes.

4. Alignment Equivalence Statement types from the W3C OWL ontology language (examples will be provided using the sample intermediate ontology of Table 1, and illustrated in FIG. 6)
   a. Class Equivalence Statement
      i. EquivalentClasses(C1 ... Cn): this statement may be used to define equivalence relationships between class elements of two ontology statements S1=<Cs1, Po1, Co1>, S2=<Cs2, Po2, Co2>
         1. The possible combinations of equivalence are Cs1~Cs2, Cs1~Co2, Co1~Cs2, Co1~Co2 which, for example in the first case, would be expressed as EquivalentClasses(Cs1, Cs2)
   b. Individual Equivalence Statement
      i. In ontologies, individual membership of a class may be stated as a class assertion
         1. ClassAssertion(C, a) where C is a class and a is an individual asserted to be a member of this class
      ii. SameIndividual(a1, ..., an): this statement may be used to define equivalence between individuals of the Subject or Object classes of ontology statements
   c. Object Property Equivalence Statement
      i. Equivalent Object Property statements may be expressed as EquivalentObjectProperties(P1, ..., Pn), which states that the properties P1 through Pn are equivalent
   d. Data Property Equivalence Statement
      i. EquivalentDataProperties(R1, ..., Rn): asserts the data properties R1 through Rn are equivalent It should be appreciated that, in other embodiments, various other relationships, terms, concepts, etc. may be provided as part of an alignment method.

Figure 2:
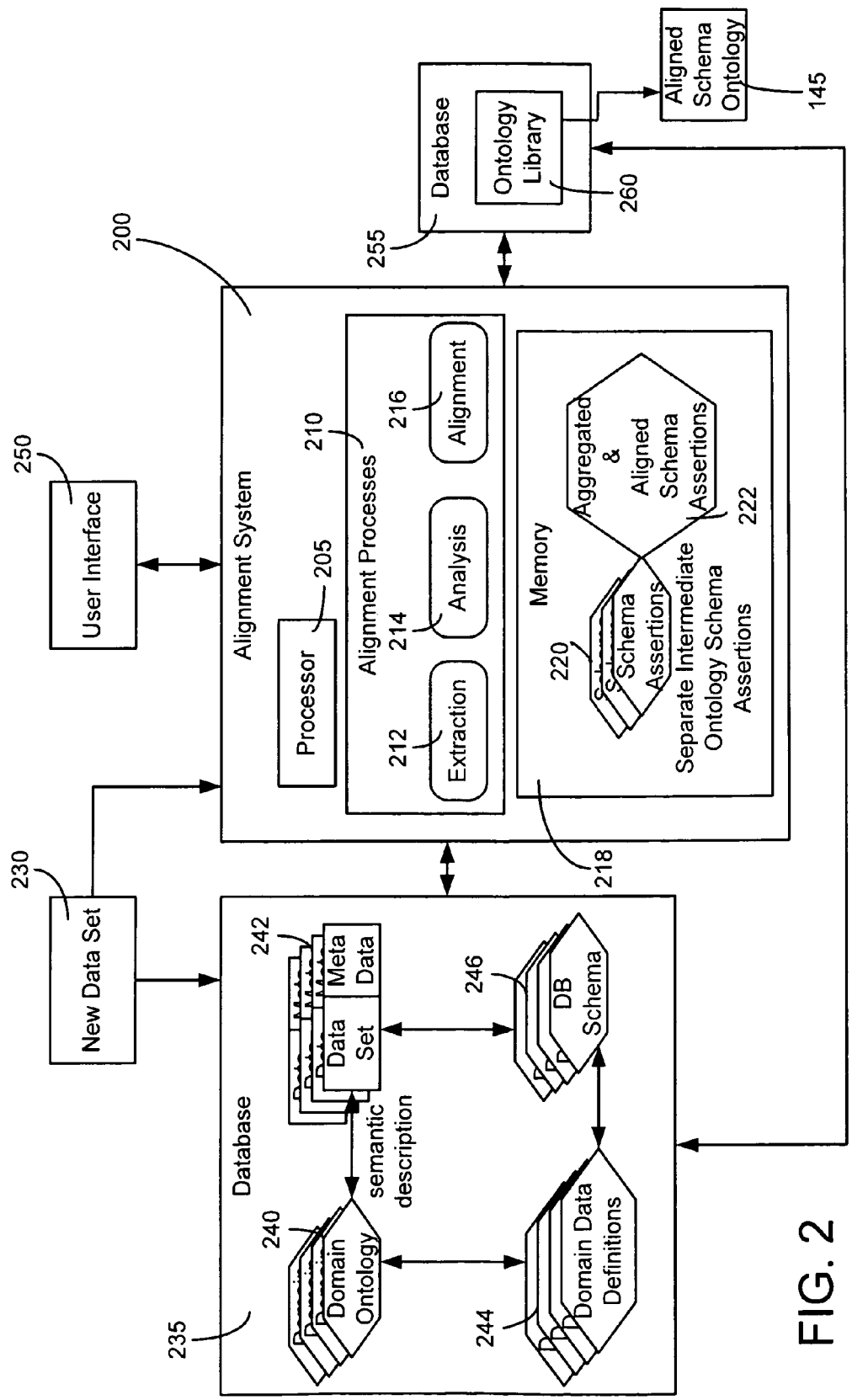
FIG. 2 is a block diagram of an alignment system configured to align a new data set with an existing ontology according to an exemplary embodiment.

Referring now to FIG. 2, a block diagram of an alignment system 200 configured to receive one or more new data sets 230 and align the data sets with known, existing data sets and/or a known ontology is shown according to an exemplary embodiment. Alignment system 200 is configured to ultimately enable automated alignment of new dataset database schemas 246 with an existing ontology (e.g., aligned ontology 145) representing knowledge and data associated with one or more existing data sets 242 and their schemas 246. Each data set has a respective schema 246. In some embodiments, the schema may be explicit and/or known, while, in other embodiments, the schema may be implicit and/or unknown and, as such, may require analysis of the dataset itself to recover the schema. The schema describes how the data is organized and labeled. In some embodiments, the schema may also have associated definition sources, such as a set of domain data definitions 244 describing terminology included in the data set with constrained data values. In some embodiments, languages used for these type of data definitions may be set forth in W3C XML schema statements. Other embodiments may associate a domain ontology 240 with the data set, where the ontology defines a model of entities (concepts, classes, objects) in a domain through interpretation of the ontology concepts and how they are related to one another in a semantic model. Alignment system 200 is configured to align new data sets to previously encountered and aligned data sets (e.g., evolutionary aligned schema 145) so that terms and relationships between terms can be used consistently (e.g., by an analyst to produce new information relationships from multiple sources. The previously described principles of alignment may be used to perform the alignment.

Alignment system 200 is configured to receive a new data set 230 (e.g., an unknown data set) and align new data set 230 with data from one or more preexisting data sets 242 and their associated schemas 246 stored in a database 235. Aligning new data set 230 with data from preexisting data sets 242 and their schemas 246 may include revising aligned schema ontology 145 (e.g., based on data stored in preexisting data sets 242 and/or other data) based on the data stored in new data set 230. Alignment system 200 may be configured to extract a schema from new data set 230, align the schema with the preexisting aligned schemas, and evolve the base ontology 145 based on the newly aligned data.

The base ontology 145 may be stored in an ontology library 260 of a database 255. In various embodiments, database 235 and database 255 may be implemented in the same or different information storage systems. Databases 235 and 255, memory 218, and/or memory storing instructions used to implement alignment processes 210 may include any form of computer or machine readable medium. Alignment processes 210 may be implemented using one or more of a variety of different software forms such as web services, Java classes, software agents, etc., and each embodiment may take as input electronic files, process them, and output files of appropriate types. Both input and output files may represent information about datasets, schemas, ontologies, and/or schema ontology alignment assertions. Database 235 may be configured to store one or more data sets 242, one or more domain ontologies 240 related to the data sets 242, one or more data models (schemas) 246 related to the data sets 242, and/or one or more domain data definitions 244 related to the domain ontologies 240 and/or data models (schemas) 246. In some embodiments, each data set (and/or metadata) 242 may be associated with one domain ontology 240, one domain data definition file 244, and one data model (schema) 246.

Figure 6:
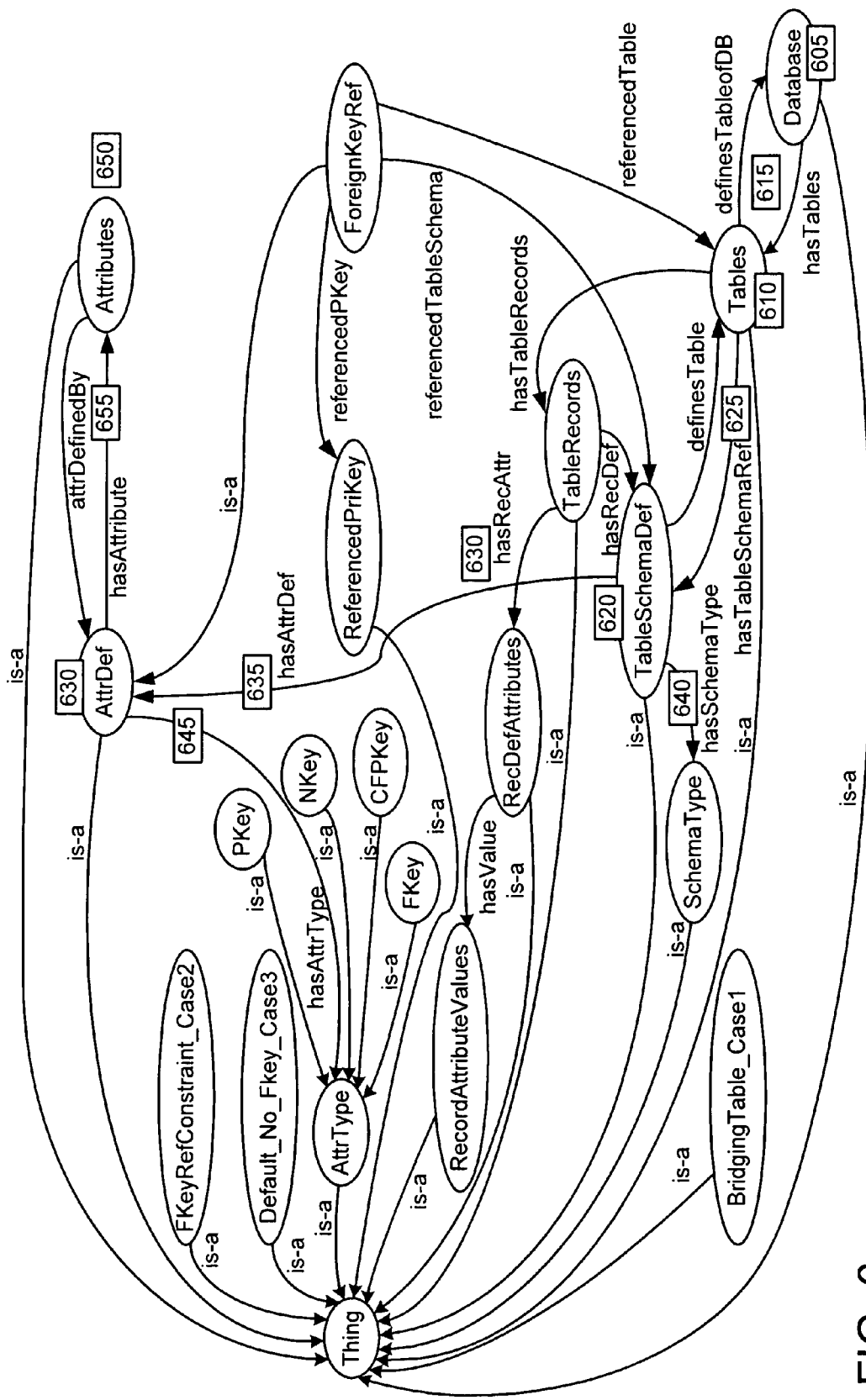
FIG. 6 is a schematic illustration of concepts and relations for an intermediate schema ontology according to an exemplary embodiment.

Alignment system 200 may include a memory 218 configured to store data (e.g., a set of intermediate ontology assertions for each schema 220 and aggregated and aligned schema assertions 222) and/or a set of alignment processes 210 that may be executed by one or more processors (e.g., a processor 205) to implement a variety of functions of alignment system 200. alignment processes 210 may include an extraction process 212 configured to analyze and extract a schema (e.g., a data model (schema)) of new data set 230 (e.g., using a schema extraction algorithm) and develop an intermediate set of ontology assertions 220 specific for each new data set 230, with a language representation using the common intermediate ontology (see, e.g., Table 1 and FIG. 6). The intermediate ontology assertions, though specific to new data set 230, may have semantic relationships with other elements contained in other schema assertions, from which alignment possibilities exist. These may be analyzed with the aforementioned alignment principles and represented using the ontology equivalence assertions for classes, object and data properties. According to various embodiments, alignment processes 210 and/or other processes and methods described herein may be implemented via one or more software modules (e.g., computer or machine-readable instructions stored on one or more computer or machine-readable media).

As discussed in further detail below, extraction module 212 may determine the schema of new data set 230 based on an explicit description of the schema (e.g., embodied in metadata associated with new data set 230) and/or an implicit or implied data model (schema).

In some embodiments, the base ontology, intermediate ontologies, and/or other ontologies described herein may be built around a representation of relationships between data elements in a subject-data property, or subject-object property-object, format. In some embodiments, W3C standards for ontology languages RDF and/or OWL may be used as a machine interpretable language to represent the schema definitions and alignment assertions of data alignment processes.

Alignment processes 210 may also include an analysis process 214 configured to process the individual intermediate ontology assertions 220 for each schema and aggregate and align them into a consistent schema where common elements are identified and matched to create the single set of schema ontology assertions 222 (e.g., using the alignment principles described previously). This set of schema ontology assertions may use the same intermediate ontology 135 language as the original individual sets of schema ontology assertions 220. This aggregated set of schema ontology assertions will be then be aligned with the evolving schema ontology 145 by final alignment process 216.

One manner of representing relationships between elements is a Resource Description Framework Model consisting of a set of RDF statements commonly known as RDF triples. RDF statements or triples contained in the RDF ontology model may be used to describe various different types of relationships between resources, or in this case a set of dataset definitions in its associated schema. A subclass property may be used to describe when a data element is a subclass of another data element. For example, the triple "dog subclass animal" may be used to represent that a dog is a subclass of the class "animal", indicating that anything that is a member of the class dog is also a member of the class animal. An instance property may be used to signify that a data element is an instance of another element (e.g., a class or subclass). For example, the statement "Spot instance dog" may be used to indicate that Spot (e.g., a particular dog) is an instance of the class "dog". In the ontology, these may be referred to as individual assertions, where individual is another name for an instance in the domain of interest. One or more relationship properties may be used to signify a particular relationship between two elements. For example, "Spot stored in New York Kennel" may be used to indicate that the particular dog Spot is stored in the kennel named the New York Kennel, where Spot is a member of the class 'dog' and 'New York Kennel" is a member of the class "kennel". From both of these instance statements, we know that Spot is a dog and is stored in the New York Kennel, which is a kennel. Further classes could be defined for location and then the Location could be another class with a relation "atLocation" with kennel as the domain and Location as the range. Then, a statement could be made such as "New York Kennel atLocation New York", where New York is an instance of class Location. This set of statements in the ontology would enable logical inference to be made that Spot is located at New York. Various types of properties or relations may be developed based on encountered data sets and/or used within the ontology to describe relationships between data elements.

Exemplary ontology representations (e.g., Web Ontology Language, or OWL) add further ontology representation capabilities for existential and universal quantifications for relations between concepts or classes, and a set of equivalence axioms that are used for alignment purposes (e.g., as described previously). OWL also enables typed data property relations to further characterize an instance of a class (e.g., the weight of an object). In some embodiments, data elements of dataset definitions (schemas) may be represented as members of classes, where some classes fall below other classes in a hierarchy and/or fall within the domain of other classes (e.g., more specialized or more general in a semantic sense). For example, a subclass dog would fall within the domain of a superclass or parent class animal. Thus, a dataset about kennels and what they store would indicate data elements defining the type of animals they store. A kennel ontology would be able to identify the key concepts and the relationships in a model that would represent knowledge about certain aspects of the business domain of a kennel, such as the types of animals they store. In some embodiments, complex classes may be defined where class definitions are stated as complex definitions of other classes. For example, a class C may be defined as including individuals within the intersection of a class A and a class B. In another example, property quantification restrictions with individuals in other classes may be used to define a particular complex class.

In some embodiments, properties may have a hierarchical relationship and/or a type. For example, properties may have a superproperty and/or subproperty relationship with one another, such that members of the classes associated with the domain and range of a subproperty are also automatically members of the classes of the superproperty or parent property. Properties may also have a type, such as symmetric, transitional, inverse, or functional. RDF and OWL statements have a binary relation defined between members of a class or to a data type property. In various embodiments, the ontology language may be defined using the publicly available W3C OWL and/or RDF standards.

Various data elements and/or statements may be combined or connected to form a network of interconnected statements, or a semantic network that represents semantic relationships among different elements or concepts. The semantic network may be formed using the statements developed based on the known data sets and/or any newly encountered data sets. In some embodiments, the semantic network may also be based on inferences that can be drawn based on two or more statements. Using the examples above, the statements "dog subclass animal" and "Spot instance dog" may be linked to infer the statement "Spot instance animal" indicating that Spot is an instance of the class "animal" because Spot is an instance of the subclass "dog" and "dog" is a subclass of the class "animal". In another example, "Spot instance dog" may be linked with "Spot stored in New York Kennel" to infer that the New York Kennel stores dogs.

Alignment Processes 210 may also include an alignment module 216 configured to align the intermediate schema ontology assertions for new data set 230 with the previously existing base ontology 145 via the current aggregated and aligned intermediate ontology assertions 222 (see also, e.g., ref no. 155) for existing schemas. Alignment module 216 is configured to analyze the intermediate schema ontology aggregated and aligned assertions 222 and align them with the base ontology 145, using the previously described alignment principles and assertions. This alignment determines and expresses the semantic relationships between elements in the aggregated intermediate schema ontology assertions 222 and the base schema ontology 145.

Alignment module 216 may be configured to determine a traceability relationship (e.g., mapping elements of the intermediate schema ontology assertions (e.g., 222 and/or 155) to elements of the base ontology 145 and store that mapping relationship (e.g., to ensure traceability of the mapping) in memory 218, database 235, and/or database 255. In some embodiments, the mapping relationship may itself be represented as a mapping ontology that specifies the relationship between various elements of the ontologies. Alignment module 216 may be configured to perform analysis of the mapping ontology (e.g., analyze the assertions associated with the mapping ontology) and modify and/or evolve the schema aligned ontology based on the assertions. The evolved schema aligned ontology 145 may be stored in ontology library 260 of database 255, in database 235, and/or in memory 218. The evolved schema aligned ontology 145 may then be used as the base ontology when incorporating information from subsequently received new data sets.

Alignment Processes 210 also include an analysis module 214 configured to receive requests from a user (e.g., an analyst) and/or to provide information to the user via a user interface 250. Analysis module 214 may be configured to receive a query from the user relating to one or more information items stored in databases 235 and/or 255. Analysis module 214 may be configured to generate a response to the query using the evolved schema aligned ontology 145 (e.g., stored in ontology library 260). In some embodiments, memory 214 may be configured to store analysis data 218 related to (e.g., used to respond to) the received query.

Figure 3:
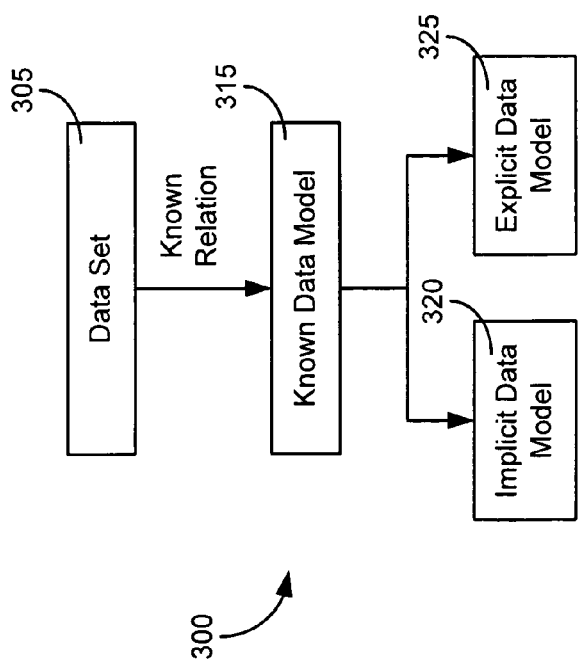
FIG. 3 is a block diagram further identifying possible implicit and explicit nature of known data model

Referring now to FIG. 3, a block diagram 300 further illustrating possible forms of metadata that may be associated with a data set is shown according to an exemplary embodiment. A data set 305 (e.g., a new data set) has a known schema 315 (e.g., where the relationship between data elements is defined and known to exist, either in an explicit separate electronic form, or in a derived form from analysis of the dataset itself). An explicit schema 325 may be based on an explicit metadata representation and/or language (e.g., a metadata file associated with data set 305), while an implicit data model (schema) 320 may not include an electronic metadata representation, but instead may have a related document describing the schema. Each dataset has an associated schema defining its elements and structure, whether in a separate explicit electronic metadata representation, or via an external document, or inherent within the dataset itself which can be recovered through analysis. The explicit schema 325 may be analyzed and transformed using the extraction process 212. The same process could also be used to extract the implicit schema inherent in the data set itself (320).

Figure 4:
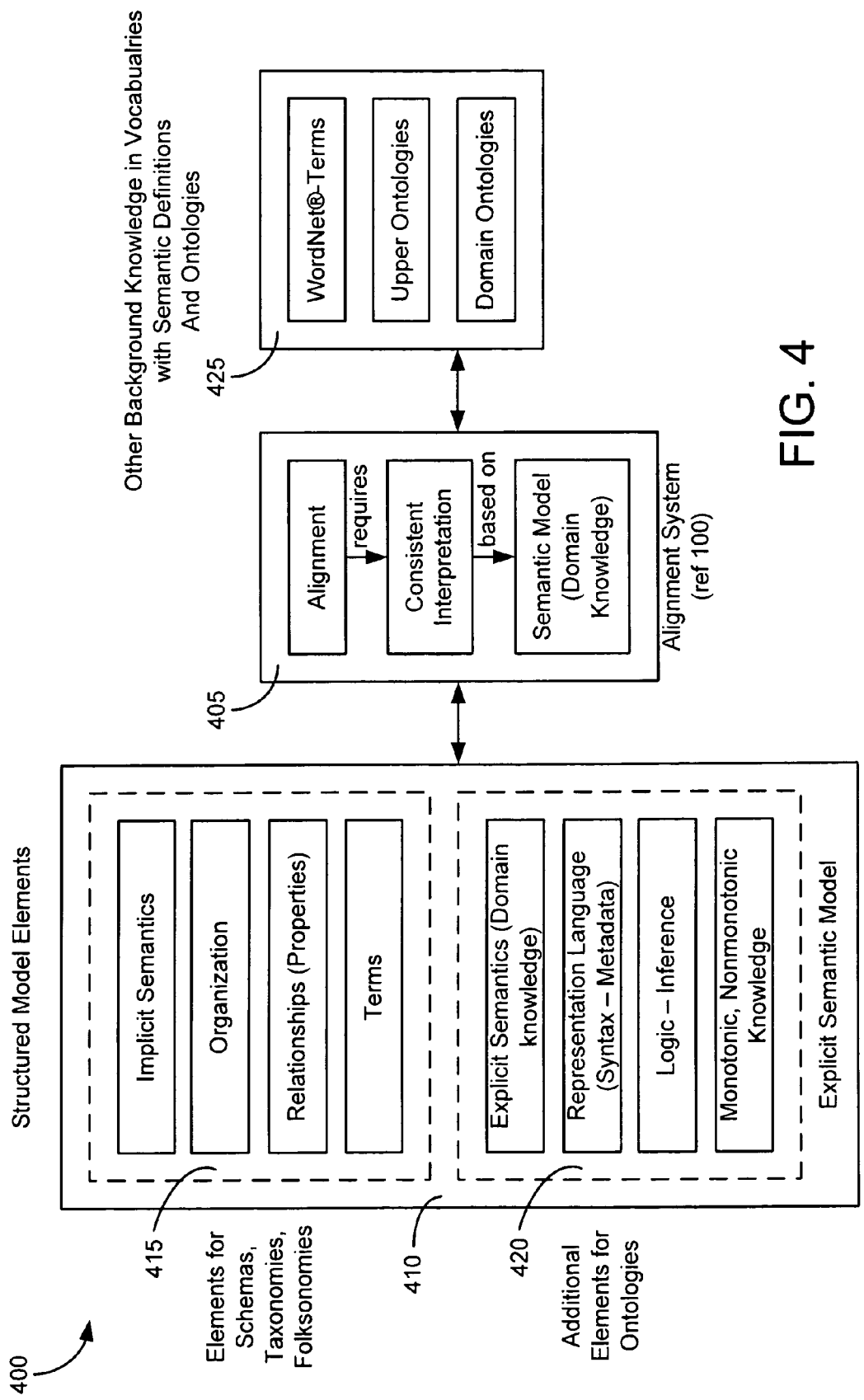
FIG. 4 is a block diagram illustrating the structural elements of the alignment model.

Referring now to FIG. 4, a block diagram 400 illustrating the use of an additional background knowledge 425 by an alignment system 405 (e.g., alignment system 200) to evolve the explicit semantic model for the schema aligned ontology 145 is shown according to an exemplary embodiment. Alignment system 405 (e.g., via alignment processes such as alignment processes 210) has the ability to leverage background definitions of terms, such as WordNet®, and supplementary background knowledge in the form of upper ontologies and/or domain ontologies. Elements from background knowledge forms 425 may be based on, constructed from, and/or include a variety of elements (e.g., elements of schemas, taxonomies, folksonomies, ontologies, etc.) and may be used to replace or associated with terms in the evolutionary schema aligned ontology 145. One such element is the terms used in the schema and data set. In one embodiment, an initial set of terms may be obtained from the WordNet® database, which is a large lexical database of the English language developed by Princeton University. Another element of the unstructured or implicit model 425 is relationships (e.g., structural or contextual relationships) between the terms included in the schema and from those defined via background knowledge in associated domain or upper ontologies. Another element of implicit model 425 is the organization of the terms in the schema and/or data set. For example, data in a data set may be structured in such a way that particular terms are included in the same row or same column of a table. In another example, some terms may be listed in a first level in a hierarchical structure and other terms may be listed in a second level that is higher or lower than the first level. The implicit semantics may be implied or inferred from the organization, structural relationships, and/or other elements of background knowledge 425 and may describe how the different concepts or terms relate to one another. The implicit semantics and/or organization of the background knowledge 425 may be represented by and/or embodied in a semantic network representation, such as a directed graph connecting terms (e.g., subjects and objects) based on one or more types of relationships between the terms (e.g., properties).

Elements 410 may include implicit semantic elements 415 from schemas, taxonomies, and folksonomies and/or explicit semantic elements 420 from other ontologies. Implicit semantic elements 415 may be described in a document, and a machine representation may have an organizational structure, a set of simple taxonomic relationships, and/or a defined set of terms or vocabulary. Explicit semantic elements 420 may be associated with some domain and may have metadata language to represent the expressions and model and a logic to enable inference. Explicit semantic elements 420 may be monotonic, such that they cannot change the truthfulness of previously defined assertions. More complex model logics may enable nonmonotonic knowledge where previous assertions may be defined to be conditionally true or probabilistically true. Similar elements for both of these semantic types may be provided with respect to implicit background knowledge 425. Explicit semantic elements 420 may also include additional elements used to represent the semantics in a formally defined ontology, or formal representation of knowledge as a set of concepts within a defined domain. Explicit model 420 includes explicit semantics, or knowledge of the domain of entities, properties, and relationships associated with the schema. The domain describes the entities, properties, and relationships among them for a domain of interest. Knowledge representation in this context assumes a language such as W3C RDF and OWL for defining an ontology to include the terms and relationships that may be used with the model. The representation language may use terms defined according to syntax embodied in metadata associated with the schema 242, 246.

An ontology may define what knowledge can be represented about individuals in a domain and constrain what can be said or inferred about individuals in the domain. An ontology may utilize a knowledge base that expresses facts about specific individuals using the ontology language and model. In some embodiments, the assertions about individuals may be associated with individual elements of the schema (e.g., for extraction of the schema). For example, a Web Ontology Language (OWL) knowledge base can continuously add new facts about individuals and/or add new individuals of a domain, consistent with the ontology model theory, but it cannot itself represent new classes of individuals, their properties, and/or model new relationships between them without modification of the ontology itself.

Explicit model 420 also includes a particular type of logic that defines how inferences may be drawn based on various elements of the schema.

Alignment system 405 may be configured to utilize the implicit background knowledge 425 with structured elements 410 to evolve the aligned schema ontology 145. Alignment of the schemas requires consistent interpretation of the terms and relationships embodied in each of the models. In order to align the two schemas, a common semantic model should be utilized to represent knowledge about schemas in a common way. This may be achieved through definition of the intermediate schema ontology 135.

As described previously, semantic alignment is performed across multiple types of schema elements and at multiple levels of implicit or explicit semantic representation. The schemas may be aligned at a lexical level to determine the word sense of terms (defined by WordNet® for example) that are used in the models in a use context and a known language.

The alignment processes 210 may utilize this background knowledge to semantically associate other terms with the schema terms and expand the possibility of a semantic match between schema definitional terms. In this way, the terms utilized by the schemas may also be aligned. Metadata relating to language, terms, definitions, etc. used to describe actual instance data and/or model definitions in each model may also be used for alignment purposes. The scope of concepts represented within the models may be used for alignment purposes, including taxonomy, vocabulary, data definitions, and upper and domain ontology.

Figure 5:
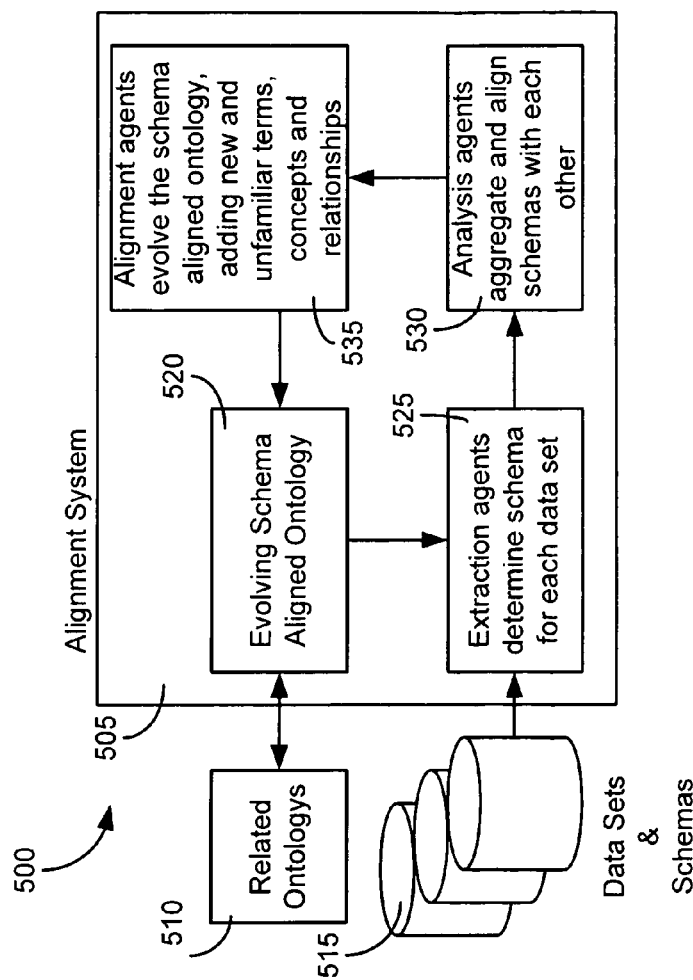
FIG. 5 is a hybrid block and flow diagram of an alignment system that may be used to align one or more data sets with a base ontology according to an exemplary embodiment.

Referring now to FIG. 5, a data flow diagram 500 of an alignment system 505 (e.g., implemented using software agents) used to align one or more data sets and associated schemas 515 with a schema aligned ontology 520 is shown according to an exemplary embodiment. In some embodiments, the agent elements 525, 530, and 535 described in FIG. 5 may be correlated with the alignment processes 212, 214, and 216, respectively, identified in FIG. 2. FIG. 5 assists in describing the role of the agents which are responsible for processing the information elements that lead to the evolution of the schema aligned ontology 520 (see also, e.g., ref. nos. 145, 930). Concepts and relations from related ontologies 510 and background knowledge (e.g., ref. no. 425, such as WordNet®) may be used to extend and align the terms and relations of the evolving schema aligned ontology 520 for alignment system 505. In this way, the dataset schemas are extended with additional meaning from related ontologies. Extraction agents of alignment system 505 are used to extract a schema for each data set 515 (step 525) and to create a set of intermediate ontology assertions representing knowledge of the terms and structure for that schema. For some data sets (e.g., having an explicit schema), the extraction agents will determine the schema based on schema definitional metadata associated with the data sets (in some embodiments this may take the form of an XML schema). For other data sets (e.g., having an implicit schema inherent in the dataset itself), the extraction agents will analyze the dataset structure to infer the dataset schema.

Referring now to FIG. 6 and Table 1, for the defined elements and model of the intermediate schema ontology, the extraction and transformation of the schema by the extraction agents may create a set of intermediate ontology assertions (e.g., ref. no. 130 of FIG. 1A) used to represent knowledge about the structure and elements of an individual dataset schema (see, e.g., step 525 of FIG. 5).

The following Table 1 defines the relationships between dataset/database elements, the related dataset schema, and the elements of the intermediate schema ontology, in terms of its classes and properties, according to one exemplary embodiment. These terms are also illustrated as a graphical model relating the intermediate ontology terms in FIG. 6.

TABLE 1

Exemplary Mapping between DatabaseSchema Elements and Intermediate Ontology

| Database Element | DBSchemaToOnt Element | Ontology Class Description | Ontology Object Property | Description |
| --- | --- | --- | --- | --- |
| Relational Database | (605) Class:DataBase | Named Individuals are asserted for each Database which has a schema to be aligned | (615) hasTables(Tables) | Relates individual of DataBase to one or more individuals in Tables ontology class |
| | | | definesTableofDB(DataBase) inverse property | Each Named Table individual is associated with only one DataBase individual |
| Tables or Relation | (610) Class:Tables | Named individuals are asserted for each Table in the DataBase | (625) hasTableSchemaDef(table SchemaDef) Functional Property | Relates each individual of Tables to its unique Table Schema definition |
| | | | Inverse Functional Property definesTable(Tables) | Each Table Schema definition is associated with only one unique Tables individual |
| Table Schema Relational Model | (620) Class:TableSchemaDef | For each named Table a unique named individual is created in {TableSchema Def with the name TableName + "SchemaDef"} | (635) hasAttrDef(AttrDef) | Relates TableSchemaDef individual to one or more individuals of AttrDef |
| | | | (640) Functional Property hasSchemaType(SchemaType) | Relates TableSchemaDef individual to its Schema Type which is one of set of three individuals, "NotC", "NotP", or "OnlyC" which are used to classify the Schema for each table |
| Classification of Table Schema | SchemaType | Classifies table schema | No Properties | No properties have been defined since this is a terminal class with three predefined individuals: NotP NotC OnlyC Classifies table schema as having no separate Primary Keys "NotP", no combined Primary and Foreign Keys "NotC", and only combined Primary and Foreign Keys "OnlyC" |
| Table Attributes | (630) AttrDef | Each table's attributes are | Functional Property (645) hasAttrType(AttrType) | Relates individual of AttrDef to one individual of AttrType |

TABLE 1-continued

Exemplary Mapping between DatabaseSchema Elements and Intermediate Ontology

| Database Element | DBSchemaToOnt Element | Ontology Class Description | Ontology Object Property | Description |
|---|---|---|---|---|
| or Columns | | uniquely associated with an individual of AttrDef (TableName + ColumnName + "AttrDef"} | (655) has Attribute(Attribute) | which provides definition of type of attribute, either Primary Key (PKey), Non Key (NKey), Foreign Key (FKey), or combined Primary and Foreign Key (CFPKey) Relates individual of AttrDef to the individual with name of the table Column or Attribute |
| Table Columns | (650) Attribute | Each AttrDef is related to the original name of the Table Column | Inverse property attrDefinedBy (AttrDef) | Relates each individual of Attribute to its Attribute Definition individual |
| Table Columns | AttrType | Classifies table columns | No Properties | Classifies columns as one of either subclasses of AttrType Primary Key:PKey ForeignKey:FKey Non Key:NKey Combined FP Key: CFPKey |
| Table Columns | PKey | Classifies Column as Primary Key | Subclass of AttrType | Single Individual constant for PKey predefined as "PKeyType" |
| Table Columns | FKey | Classifies Column as Foreign Key | Subclass of AttrType | Single Individual constant for PKey predefined as "FKeyType" |
| Table Columns | NKey | Classifies Column as not a Key type | Subclass of AttrType | Single Individual constant for PKey predefined as "NKeyType" |
| Table Columns | CKey | Classifies Column as combined Primary and Foreign Key type | Subclass of AttrType | Single Individual constant for PKey predefined as "CKeyType" |

Figure 7:
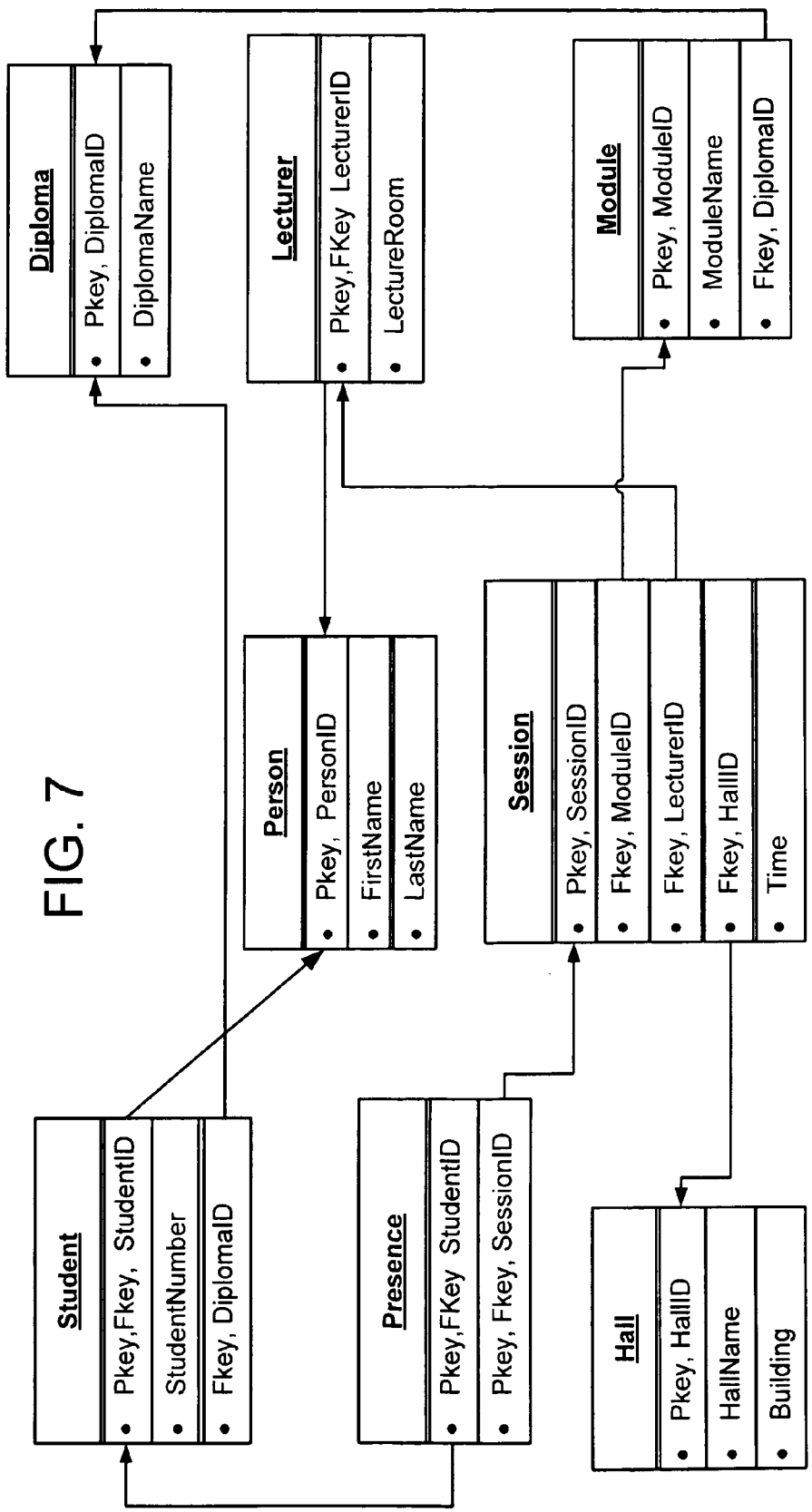
FIG. 7 is a block diagram illustrating the tables and associated field names of an example database schema.

The following describes the application of the schema extraction and transformation step 525 and representation of assertions using the DBSchemaToOnt ontology from an example schema illustrated in FIG. 7, according to one exemplary embodiment. In this exemplary embodiment, the intermediate ontology assertions listed below (as described in OWL) follow the sequence identified in FIG. 6, steps 605 through 655 as applied to the example database schema illustrated in FIG. 7.

(605) Example Database Assertion
    <owl:Thing rdf:about="#ExampleDBSchema".> "Individual Name of Database"
    <rdf:type rdf:resource="#DataBase"/>
    <rdfs:label>ExampleDBSchema</rdfs:label>
    </owl:Thing>

(610) Example Individual Table Assertion in Ontology Class "Tables"
    <owl:Thing rdf:about="#Diploma">"New Individual Diploma table asserted in Class 'Tables'
    <rdf:type rdf:resource="#Tables"/>"Class where Diploma is asserted to be member of"
    <rdfs:label>Diploma</rdfs:label> "Non processed label, typically should have same name as the asserted individual in rdf:about"
    </owl:Thing>

(615) Example Object Property Assertion for "hasTables" in Class "DataBase"
    <owl:Thing rdf:about="#ExampleDBSchema"> "Individual Name of Database"
    <rdf:type rdf:resource="#DataBase"/>
    <hasTables rdf:resource="#Diploma"/> "Asserts Individual Table Diploma as Range of hasTables property"
    <hasTables rdf:resource="#Hall"/> "Asserts Individual Table Hall as Range of hasTables property"
    <other table assertions>
    <rdfs:label>ExampleDBSchema</rdfs:label>
    </owl:Thing>

(620) Example Individual (Hall_SchemaDef) Assertion in Class "TableSchemaDef"
    <TableSchemaDef rdf:about="#Hall_SchemaDef">
    "Asserts Individual Table Hall as member of class TableSchemaDef—Each name must follow the form 'TableName+"SchemaDef"'"
    <rdf:type rdf:resource="http://www.w3.org/2002/07/owl#Thing"/>
    <rdfs:label>HallSchemaDef</rdfs:label>
    </TableSchemaDef>

(625) Example Object Property Assertion for "hasTableSchemaDef" for Individuals in Class Tables
    <owl:Thing rdf:about="#Hall">
    <rdf:type rdf:resource="#Tables"/>
    <rdfs:label>Hall</rdfs:label>
    <hasTableSchemaDef rdf:resource="#Hall_SchemaDef"> "Asserts Individual 'Hall_SchemaDef' as Range of hasTableschemaDef property for domain individual 'Hall' in class Tables"
    </owl:Thing>

(630) Example Individual (Hall_HallID) Assertion for Class "AttrDef"
    <owl:Thing rdf:about="#Hall_HallID_AttrDef">
    "Asserts Individual 'Hall_HallID' as member of class AttrDef—Each name must follow the form 'TableName+ColumnName+'AttrDef'"
    <rdf:type rdf:resource="#AttrDef"/>
    <rdfs:label>Hall_HallID_AttrDef</rdfs:label>
    </owl:Thing>

(635) Example Object Property Assertion for "hasAttrDef for Individuals in class TableSchemaDef
    <TableSchemaDef rdf:about="#Hall_SchemaDef>
    <rdf:type rdf:resource="http://www.w3.org/2002/07/owl#Thing"/>
    <rdfs:label>HallSchemaDef</rdfs:label>
    <hasAttrDef rdf:resource="#Hall_Building_AttrDef"/>
    <hasAttrDef rdf:resource="#Hall HallID AttrDef"/>
    "Asserts Individual 'Hall_HalliD' as Range of hasAttrDef property for domain individual 'Hall_SchemaDef' in class TableschemaDef"
    <hasAttrDef rdf:resource="#Hall_HallName_AttrDef"/>
    </TableSchemaDef>

(640) Example Object Property Assertion for "hasSchemaType' for Individuals in Class TableSchemaDef
    <TableSchemaDef rdf:about="#Hall_SchemaDef">
    <rdf:type rdf:resource="http://www.w3.org/2002/07/owl#Thing"/>
    <rdfs:label>HallSchemaDef</rdfs:label>
    <hasAttrDef rdf:resource="#Hall_Building_AttrDef"/>
    <hasAttrDef rdf:resource="#Hall_HallID_AttrDef"/>
    <hasAttrDef rdf:resource="#Hall_HallName_AttrDef"/>
    <hasSchemaType rdf:resource="#NotC"/> "Asserts Individual "NotC" in class 'SchemaType' as range for property hasSchemaType"
    </TableSchemaDef>

(645) Example Object Property Assertion for "hasAttrType' for Individuals in Class AttrDef
    <owl:Thing rdf:about="#Hall_HallID_AttrDef">
    <rdf:type rdf:resource="#AttrDef"/>
    <rdfs:label>Hall_HallID_AttrDef</rdfs:label>
    <hasAttribute rdf:resource="#HallID"/>
    <hasAttrType rdf:resource="#PKeyType"/>
    </owl:Thing>

(650) Example Individual Attribute Assertions in Ontology Class "Attributes" owl:Thing rdf:about="#HallID"> "Asserts Individual "HallID" in class 'Attributes', Every tables column must be asserted separately like this example.
    <rdf:type rdf:resource="#Attributes"/>
    <rdfs:label>HallID</rdfs:label>
    </owl:Thing>

(655) Example Object Property Assertion for "hasAttributes" for Individuals in Class AttrDef
    <owl:Thing rdf:about="#Hall_HallID_AttrDef">
    <rdf:type rdf:resource="#AttrDef"/>
    <rdfs:label>Hall_HallID_AttrDef</rdfs:label>
    <hasAttribute rdf:resource="#HallID"/>
    <hasAttrType rdf:resource="#PKeyType"/>
    </owl:Thing>

Once the data models (schemas) for each data set are extracted and transformed and represented using the intermediate ontology as a set of assertions, the extracted individual schema assertions may be aligned (see, e.g., FIG. 5, step 530). The same ontology alignment principles described previously may also be used to perform this alignment across schemas that have been transformed into their separate intermediate ontology assertion sets. For example, assertions may be aggregated when there is no semantic alignment between elements of the assertions, and semantically equivalent elements between the assertions may be identified and relevant equivalent assertions for the relevant equivalent schema class, property, or individual instances may be created. The analysis may be performed across all individual sets of intermediate schema ontology assertions. Since the intermediate ontology assertions represent the structure and terms of the schema, the agents can query each ontology assertion to discover equivalent elements in the evolving ontology. This may be done for each item (e.g., each item in Table 1).

Figure 8:
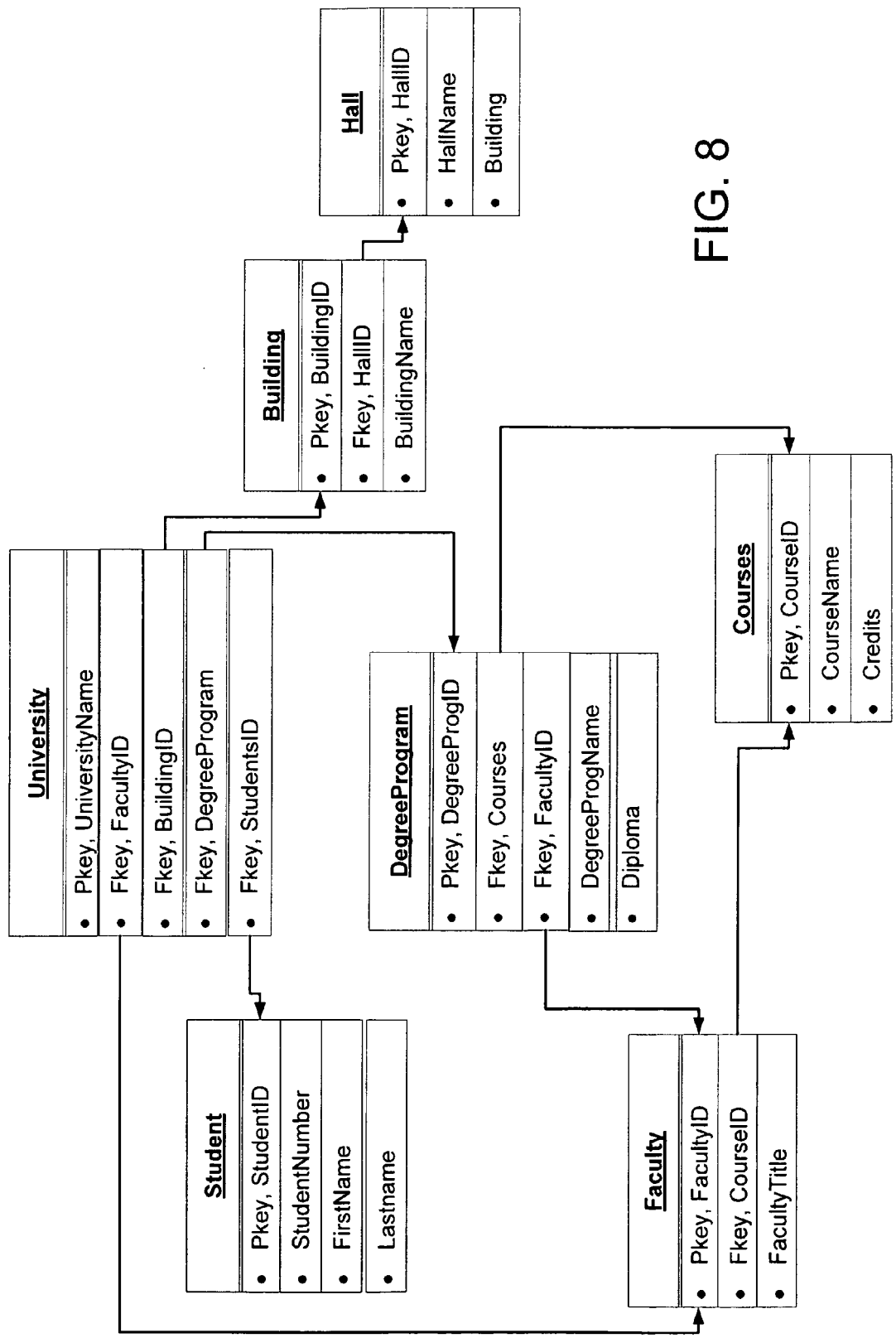
FIG. 8 is a block diagram illustrating the tables and associated field names of a second example database schema.

Another example of alignment is provided with respect to another example schema illustrated in FIG. 8 according to another exemplary embodiment. In one exemplary embodiment, the schemas illustrated in FIGS. 5B and 5C may be aligned with one another using the various alignment principles and processes described herein. The results of alignment may identify the following semantic alignments between the two schemas shown in FIGS. 7 and 8:
    1. Explicit equivalent terms: Student, Hall
    2. Semantically Equivalent: Lecturer and Faculty, Courses and Session, Degree Program and Module
    3. Unique Classes to aggregate: Presence, Diploma, Person, University, Building
    4. Sematic Hypernym, Hyponym relationships: Building Hyponym Hall, Student hypernym Person, Faculty hypernym Person, For the explicit equivalent terms, an equivalence assertion in a form similar to the following may be made in the aggregated and aligned intermediate set of assertions across all the schemas:

EquivalentClasses(Schema5B:Hall, Schema5C:Hall): in this embodiment, this statement is used to define equivalence relationships between class elements of two ontology statements S1=<Cs1, Po1,Co1>, S2=<Cs2, Po2,Co2>

Other equivalence assertions may be made for the appropriate schema elements following the alignment principles and/or processes described herein.

Subsequent to the alignment step 530, the new set of intermediate schema assertions (see, e.g., ref. no. 155 of FIG. 1A) may be aligned with the schema aligned ontology assertions (see, e.g., ref. no. 155 of FIG. 1A) in step 535. At step 535, alignment system 505 is configured to use the aligned data models (schemas) to evolve the current ontology. New classes, individuals, terms, concepts, relationships, properties, etc. are added to the ontology (e.g., new statements are added to an OWL file or group of statements) where the alignment process indicates that new information is provided in the aligned data set. The evolved ontology may be used by the alignment system as the new ontology and may be further evolved upon exposure to new data sets. Additionally, the ontology may be saved, output, etc. in a formal representation of the ontology.

Figure 9:
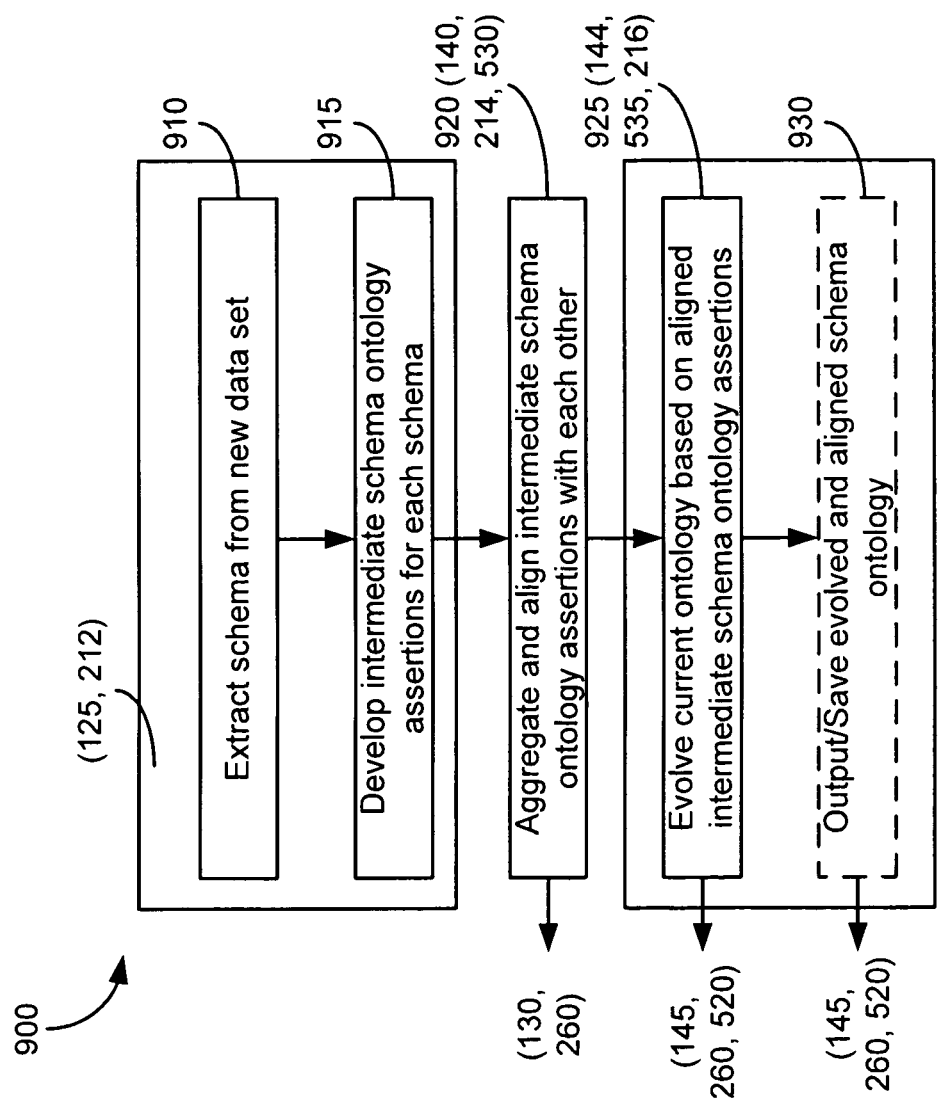
FIG. 9 is a process flow diagram illustrating the computational steps of a method of aligning a newly received data set with an existing ontology according to an exemplary embodiment.

Referring now to FIG. 9, a process flow diagram of a method 900 of aligning a newly received data set with an existing ontology is shown according to an exemplary embodiment. As illustrated, various reference numerals indicating components or method steps of other exemplary embodiments illustrated in other figures are provided. In some embodiments, the referenced components or method steps may be relevant to one or more steps shown in FIG. 9 and/or may be a part of or used in the execution of one or more of the steps shown in FIG. 9.

At step 905, a new data set is received at an alignment system. The new data set may have a known and/or structured data model (schema) (e.g., defined according to associated metadata), or the new data set may have an unknown and/or unstructured data model (schema).

At steps 910 and 915, the schema or data model (schema) is extracted from the new data set by the alignment system and assertions are made using an intermediate ontology. See, for example, Table 1 and FIG. 6 for elements of an intermediate ontology and the extraction and steps to create the new intermediate ontology assertions representing this new data model (schema) according to one exemplary embodiment. In some embodiments, the new data set may have an explicit schema. For example, the schema may be extracted based on metadata associated with the new data set that explicitly defines the structure of the data in the new data set, meaning of terms, etc. In some embodiments, the new data set may have an implicit schema. In the former case an explicit schema file can be analyzed, while in the latter (i.e., an implicit schema) the schema can be recovered from analysis of the database structure itself. For example, the schema may be inferred based on the organization of data in the new data set (e.g., column and/or row relationships), one or more recognized key terms or names (e.g., column names, row names, header names, names of data elements, etc.), or other properties of the new data set.

At step 920, the schema assertions may made using the same terms and language of the intermediate schema ontology and/or a set of equivalence assertions (e.g., as described previously). The intermediate schema ontology may be aligned to the current ontology (e.g., using terms such as those identified in Table 1) and it may be determined if there are semantic equivalents in the evolving ontology. According to one embodiment, this process may progress as follows: (1) identify similar table names, (2) identify similar table column names, (3) identify similar primary keys, and (4) identify similar foreign keys.

At step 925, the current ontology is evolved based on the intermediate schema ontology using the equivalence principles described previously. Evolving the current ontology may include adding one or more new statements or facts to the current ontology based on information contained in the intermediate schema ontology, where there are no semantic equivalents among the compared schema assertions. Where there are semantic equivalents, then new assertions may be made relating those elements from the new schemas to the current aligned schema ontology. For example, the current ontology may include the relational statements "dog subclass animal" to represent that dog is a hyponym of animal, and "Spot instance dog" to represent that Spot is an individual assigned to the class dog. The intermediate schema ontology may include the statement "Spot resides at 111 Brown Street." The current ontology may be evolved to include this statement, such that the evolved ontology contains the knowledge that Spot is a dog and Spot resides at 111 Brown Street. Further, additional knowledge may be inferred from the knowledge incorporated from the intermediate schema ontology, and additional statements may be added to the evolved ontology. For example, the current ontology may include a statement such as "111 Brown Street instance apartment," and the evolved ontology may include knowledge based on this statement and "Spot resides at 111 Brown Street" that 111 Brown Street is an apartment that permits dogs. In another example, the current ontology may contain a statement such as "John Smith resides at 111 Brown Street," and the evolved ontology may include knowledge that John Smith owns Spot and/or that John Smith is a dog owner. Various other types of relationships between data elements and/or assertions may be determined and used to evolve the current ontology according to various exemplary embodiments.

At step 930, the evolved ontology may be saved (e.g., in a database or ontology library) and/or output (e.g., to a user interface). In some embodiments, the evolved ontology may be expressed in the form of a set of OWL-2 statements. In some embodiments, the intermediate schema ontology (e.g., before and/or after alignment) for the new data set may also be saved (e.g., in a database).

In some embodiments, alignment agents may incorporate a learning capability that may improve their ability to align elements of the schemas in ontology format. Referring again to FIG. 1A, alignment agents (e.g., alignment agents 140 and/or 144) may be equipped with a learning capability that improves alignment at one or more points in the process. For example, alignment may be improved inter-schema (e.g., between schemas 130 as performed by DB Schema Alignment Agent 140) and/or between aggregated and aligned inter-schema assertions 155 and evolutionary schema aligned ontology 145 (e.g., as performed by DB Schema Ontology Alignment Agent 144). The evolutionary agents may learn to perform alignment using one or more of the following guideline patterns. Agents are trained on a corpus consisting of many different successful alignment schemas and ontologies where predefined alignment instance patterns have been identified.

In a first exemplary method, semantic matches are determined between elements of schema and ontology statements $<S, P, O>$, where S and O represent classes and P represents properties of the statement. In some embodiments, an external machine readable dictionary (e.g., WordNet® or an equivalent source) may be used to determine whether the word labels of these elements are semantically equivalent, typically using a synonym list in the dictionary related to the compared elements. When there is a semantic equivalence, then another OWL/RDF statement asserting this equivalence is added to the result (e.g., aggregated and aligned inter-schema assertions 155 and/or evolutionary schema aligned ontology 145), for example using OWL statement types described in point (2) below.

The evolutionary agents are supplied training corpus with the external dictionary to evolve their semantic matching capabilities for each synset (e.g., a group of synonymous words and/or words that go together to form a specific meaning). There may be one agent per synset in some embodiments, such that this agent evolves to learn more semantic relationships such as hypernym and/or hyponym from the corpus.

As each agent learns each synset from multiple dictionary sources, it is able to recognize with increasing accuracy sets of words that have a reasonable semantic distance to its synset. There may be cases in which a word has a relationship to more than one synset. For purposes of semantic equivalence analysis, the agents may use another set of training examples that are tagged with semantic relationships to machine readable dictionaries and synsets, and then, in some embodiments, utilize a statistical algorithm to weight the strength of the occurrence of the semantic relationships to each synset for each word. From this learning method, as more tagged training data is provided, the agents improve their ability to identify the various semantic relationships between elements of schema assertion statements and between schema assertion statements and statements of the aligned schema ontology. According to various embodiments, one or more of the following evolutionary principles and/or methods may be used to evolve the ontologies:

1. The actual alignment assertions relating elements of the individual schema assertions may be statements using the following guidelines:
   a. Statements with one or more semantic matches of elements $<S, P, O>$ i. Identifying semantic matches of the elements of the two statements being compared, e.g., the <S, P, O> of each statement,
ii. and then creating additional equivalence statements asserting equivalence where there are semantic equivalence of the respective elements <S, P, O> elements,
iii. adding the original compared assertions and the relevant equivalence assertions to the evolutionary schema aligned ontology (e.g., evolved schema aligned ontology 145)
b. Statements with no semantic matches
i. If no semantic matches occur between a statements elements and all other statements of the aligned ontology, than it is added to the aligned ontology without any additional equivalence statements
c. Semantic matches may include hypernym and hyponym relationships between classes relating to a more general semantic concepts or to a more specific semantic concepts, respectively. In some embodiments, a reference dictionary may be used to discover these relations between the names of the compared classes.
2. Alignment Equivalence Statement types from the W3C OWL ontology language (examples will be provided using the intermediate ontology of Table 1, and illustrated in FIG. 6)
a. Class Equivalence Statement
EquivalentClasses(C1, . . . , Cn) in this embodiment this statement is used to define equivalence relationships between class elements of two ontology statements S1=<Cs1, Po1, Co1>, S2=<Cs2, Po2, Co2>
1. The possible combinations of equivalence are Cs1~Cs2, Cs1~Co2, Co1~Cs2, Co1~Co2, which, for example in the first case, would be expressed as EquivalentClasses(Cs1, Cs2)
b. Individual Equivalence Statement
i. In ontologies individual membership of a class may be stated as a class assertion ClassAssertion(C a) where C is a class and a is an individual asserted to be a member of this class
ii. SameIndividual(a1, . . . , an) may be used to define equivalence between individuals of the Subject or Object classes of ontology statements
c. Object Property Equivalence Statement
i. Equivalent Object Property statements may be expressed as EquivalentObjectProperties(P1, . . . , Pn), which may state that the properties P1 through Pn are equivalent
d. Data Property Equivalence Statement
i. EquivalentDataProperties(R1, . . . , Rn) may state that the data properties R1 through Rn are equivalent The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium (e.g., non-transitory medium) which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of incorporating one or more sets of new data and adapting existing data based on the new data, comprising:
    extracting, using an extraction module, a data model from a new data set, wherein the extraction module comprises instructions stored on at least one computer-readable medium that are executable by a processor;
    generating, using the extraction module, one or more sets of schema ontology assertions based on the extracted data model, wherein a common schema alignment ontology is used to represent the extracted data model; and
    aligning, using an alignment module, the extracted data model represented using the common schema alignment ontology with at least one existing aligned ontology, wherein the extracted data model is aligned with the at least one existing aligned ontology based on one or more ontology equivalence assertions configured to link schema ontology assertions with the existing aligned ontology, wherein the alignment module comprises one or more alignment agents having been trained, using one or more training sets, to identify the one or more ontology equivalence assertions, and wherein the alignment module comprises instructions stored on the at least one computer-readable medium that are executable by the processor;
    wherein aligning the extracted data model with the at least one existing aligned ontology comprises:
        determining the existence of one or more semantically equivalent elements contained within the schema ontology assertions;
        generating one or more new schema ontology assertions based on the schema ontology assertions containing the semantically equivalent elements, wherein the one or more new schema ontology assertions comprise new assertions relating elements found in the schema ontology assertions containing the semantically equivalent elements, and wherein the one or more new schema ontology assertions were not previously included within either the one or more sets of schema ontology assertions or the existing aligned ontology; and
        generating a set of aligned ontology assertions based on the one or more new schema ontology assertions.

2. The method of claim 1, wherein the one or more new sets of data comprise a plurality of new data sets, and wherein:
    extracting a data model from a new data set comprises extracting a plurality of data models, wherein each of the plurality of data models corresponds to one of the plurality of new data sets;
    generating one or more sets of schema ontology assertions based on the extracted data model comprises generating one or more ontology assertions based on each of the plurality of data models using the common schema alignment ontology;
    the method further comprises aligning, using the alignment module, the separate generated schema ontology assertions to generate a set of interschema aligned ontology assertions; and
    aligning the extracted data model represented using the common schema alignment ontology with at least one existing aligned ontology comprises aligning the set of interschema aligned ontology assertions with the at least one existing aligned ontology based on one or more equivalent elements identified between the interschema aligned ontology assertions and the at least one existing aligned ontology.

3. The method of claim 2, wherein aligning the separate generated schema ontology assertions to generate a set of interschema aligned ontology solutions comprises:
    creating one or more new sets of ontology equivalence assertions where elements of two or more of the generated schema ontology assertions are determined equivalent; and
    aggregating the generated schema ontology assertions where elements of the generated schema ontology assertions are not equivalent with elements of other generated schema ontology assertions.

4. The method of claim 2, wherein aligning the generated schema ontology assertions to generate a set of interschema aligned ontology assertions comprises:
    determining the existence of one or more semantically equivalent elements contained within the schema ontology assertions;
    generating one or more new interschema equivalence ontology assertions based on the schema ontology assertions containing the semantically equivalent elements; and
    generating the set of interschema aligned ontology assertions based on the one or more new interschema equivalence ontology assertions.

5. The method of claim 2, wherein aligning the set of interschema aligned ontology assertions with the at least one existing aligned ontology comprises:
  determining the existence of one or more semantically equivalent elements contained within schema ontology assertions of the set of interschema aligned ontology assertions and the at least one existing aligned ontology; and
  generating one or more new ontology equivalence assertions based on the schema ontology assertions containing the semantically equivalent elements.

6. The method of claim 5, wherein the existence of one or more semantically equivalent elements contained within the schema ontology assertions is determined based on a computer-readable dictionary comprising a plurality of sets of semantically equivalent terms.

7. The method of claim 1, wherein extracting the data model from the new data set comprises determining the data model from a data file that explicitly describes the data model of the new data set.

8. The method of claim 1, wherein extracting the data model from the new data set comprises inferring the data model based on an organization of data in the new data set.

9. A data alignment system, comprising:
  an electronic processor configured to
    extract one or more schemas from one or more new data sets;
    determine one or more schema ontology assertions based on the extracted one or more schemas using a common schema ontology to represent each new data set;
    align the one or more schemas to generate an interschema aligned ontology by determining semantic equivalence between elements of the one or more schema ontology assertions extracted one or more schemas and generating one or more new ontology equivalence assertions based on determined equivalent elements, wherein the one or more new ontology equivalence assertions comprise new assertions relating elements found in the schema ontology assertions containing the semantically equivalent elements, and wherein the one or more new ontology equivalence assertions were not previously included within the determined one or more schema ontology assertions; and
    modify at least one existing final ontology by determining semantic equivalence between elements of the interschema aligned ontology and the at least one existing final ontology using a common set of final ontology equivalence assertions and modifying the at least one existing final ontology based on the determined equivalent elements, wherein the electronic processor is configured to align the determined schema ontology assertions to generate a set of aligned schema ontology assertions using an alignment module comprising one or more alignment agents having been trained to identify instances of semantic equivalence between elements of ontology assertions using one or more training sets, wherein the alignment agents are configured to implement alignment through use of a common set of alignment equivalence assertion statements.

10. The system of claim 9, wherein the one or more new sets of data comprise a plurality of new data sets, and wherein the electronic processor is configured to:
  extract a plurality of schemas, wherein each of the plurality of schemas corresponds to one of the plurality of new data sets;
  determine one or more schema ontology assertions based on each of the plurality of schemas using the common schema ontology;
  align the determined schema ontology assertions to generate a set of aligned schema ontology assertions; and
  modify the at least one existing final ontology based on the set of aligned schema ontology assertions.

11. The system of claim 10, wherein the electronic processor is configured to align the determined ontology assertions to generate a set of aligned ontology assertions by:
  determining the existence of one or more semantically equivalent elements between the schema ontology assertions;
  generating one or more new schema ontology assertions based on the schema ontology assertions containing the semantically equivalent elements; and
  generating the set of aligned schema ontology assertions based on the one or more new ontology assertions.

12. The system of claim 11, wherein the electronic processor is configured to modify the at least one existing final ontology by:
  determining the existence of one or more semantically equivalent elements contained within schema ontology assertions of the set of aligned schema ontology assertions and the at least one existing final ontology;
  generating one or more new schema ontology assertions based on the schema ontology assertions containing the semantically equivalent elements; and
  modifying the at least one existing final ontology based on the one or more new schema ontology assertions.

13. The system of claim 11, wherein the electronic processor is configured to determine the existence of one or more semantically equivalent elements contained within the schema ontology assertions based on a computer-readable dictionary comprising a plurality of sets of semantically equivalent terms.

14. The system of claim 9, wherein the processor is configured to extract the schema from the new data set by determining the schema from a data file that explicitly describes the schema of the new data set.

15. The system of claim 9, wherein the processor is configured to extract the schema from the new data set by inferring the schema based on an organization of data in the new data set.

16. The system of claim 9, wherein the processor is configured to modify at least one existing final ontology by:
  determining the existence of one or more semantically equivalent elements contained within the schema ontology assertions;
  generating one or more new schema ontology assertions based on the schema ontology assertions containing the semantically equivalent elements; and
  generating a set of aligned schema ontology assertions based on the one or more new schema ontology assertions.

17. The system of claim 16, wherein the processor is configured to extract the schema from the new data set by inferring the schema based on an organization of data in the new data set.

18. The system of claim 9, wherein the electronic processor is configured to modify the at least one existing final ontology using an alignment module comprising one or more alignment agents having been trained to identify instances of semantic equivalence between elements of ontology assertions using one or more training sets, wherein the alignment agents are configured to implement alignment through use of a common set of alignment equivalence assertion statements.

19. One or more non-transitory computer-readable media having instructions stored thereon, the instructions being executable by one or more processors to implement a method comprising:

extracting a data model from a new data set;

generating one or more sets of schema ontology assertions based on the extracted data model, wherein a common schema alignment ontology is used to represent the extracted data model; and aligning, using an alignment module, the extracted data model represented using the common schema alignment ontology with at least one existing aligned ontology, wherein the extracted data model is aligned with the at least one existing aligned ontology based on one or more ontology equivalence assertions configured to link schema ontology assertions with the existing aligned ontology, wherein the alignment module comprises one or more alignment agents having been trained, using one or more training sets, to identify the one or more ontology equivalence assertions; wherein aligning the extracted data model with the at least one existing aligned ontology comprises:

determining the existence of one or more semantically equivalent elements contained within the schema ontology assertions;

generating one or more new schema ontology assertions based on the schema ontology assertions containing the semantically equivalent elements, wherein the one or more new schema ontology assertions comprise new assertions relating elements found in the schema ontology assertions containing the semantically equivalent elements, and wherein the one or more new schema ontology assertions were not previously included within either the one or more sets of schema ontology assertions or the existing aligned ontology; and generating a set of aligned ontology assertions based on the one or more new schema ontology assertions.

* * * * *